United States Patent
Lee et al.

(10) Patent No.: US 12,309,628 B2
(45) Date of Patent: May 20, 2025

(54) METHOD AND APPARATUS FOR PERFORMING MEASUREMENTS IN NR V2X

(71) Applicant: LG ELECTRONICS INC., Seoul (KR)

(72) Inventors: Jongyoul Lee, Seoul (KR); Youngdae Lee, Seoul (KR); Seungmin Lee, Seoul (KR); Giwon Park, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 363 days.

(21) Appl. No.: 17/774,664

(22) PCT Filed: Jul. 8, 2020

(86) PCT No.: PCT/KR2020/008892
§ 371 (c)(1),
(2) Date: May 5, 2022

(87) PCT Pub. No.: WO2021/091042
PCT Pub. Date: May 14, 2021

(65) Prior Publication Data
US 2022/0408294 A1   Dec. 22, 2022

Related U.S. Application Data

(60) Provisional application No. 62/932,446, filed on Nov. 7, 2019.

(30) Foreign Application Priority Data

Nov. 6, 2019 (KR) .......................... 10-2019-0141185
Nov. 7, 2019 (KR) .......................... 10-2019-0142130

(51) Int. Cl.
*H04W 24/10* (2009.01)
*H04W 92/18* (2009.01)

(52) U.S. Cl.
CPC ............ *H04W 24/10* (2013.01); *H04W 92/18* (2013.01)

(58) Field of Classification Search
None
See application file for complete search history.

(56) References Cited

U.S. PATENT DOCUMENTS

2012/0120810 A1    5/2012  Wang et al.
2020/0145867 A1*   5/2020  Tseng .................... H04W 76/14
(Continued)

FOREIGN PATENT DOCUMENTS

WO    WO2014007476    1/2014
WO    WO2014014328    1/2014

OTHER PUBLICATIONS

3GPP, "5G; NR; Radio Resource Control (RRC); Protocol specification," TS 38.331 version 15.7.0 Release 15, Oct. 2019, 523 pages.
(Continued)

*Primary Examiner* — Clemence S Han
(74) *Attorney, Agent, or Firm* — Fish & Richardson P.C.

(57) ABSTRACT

Provided are a method by which a first device performs wireless communication, and an apparatus for supporting same. The method comprises the steps of: transmitting, to a second device, a measurement configuration including a measurement object, a measurement identity, reporting configurations, and quantity configurations, wherein the reporting configurations include information related to a first report interval; and receiving a plurality of measurement report messages, including a measurement result obtained on the basis of the measurement configuration, from the second device on the basis of the first reporting interval, wherein the first report interval can be determined by a first device.

20 Claims, 25 Drawing Sheets

(56) References Cited

U.S. PATENT DOCUMENTS

2020/0322024 A1* 10/2020 Cheng ................... H04W 76/11
2021/0105055 A1*  4/2021 Chae .................... H04L 5/0026
2021/0368372 A1* 11/2021 Chen .................... H04W 24/08
2022/0286255 A1*  9/2022 Guo ..................... H04L 5/006

OTHER PUBLICATIONS

ITRI, "Resource Allocation Mechanism for NR Sidelink Mode 2," R1-1910859, Presented at 3GPP TSG RAN WG1 #98bis, Chongqing, China, Oct. 14-20, 2019, 10 pages.
Nokia & Nokia Shanghai Bell, "Summary#2 of AI 7.2.4.6, QoS Management," R1-1911632, Presented at 3GPP TSG RAN WG1 #98bis, Chongqing, China, Oct. 14-20, 2019, 19 pages.

* cited by examiner (a)

(b)

(a)

(b)

METHOD AND APPARATUS FOR PERFORMING MEASUREMENTS IN NR V2X

CROSS-REFERENCE TO RELATED APPLICATIONS

This application is a National Stage application under 35 U.S.C. § 371 of International Application No. PCT/KR2020/008892, filed on Jul. 8, 2020, which claims the benefit of U.S. Provisional Application No. 62/932,446, filed on Nov. 7, 2019, Korean Application No. 10-2019-0141185, filed on Nov. 6, 2019, and Korean Application No. 10-2019-0142130, filed on Nov. 7, 2019. The disclosures of the prior applications are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, the UE may report a SL-RSRP measurement result to another UE periodically or aperiodically. In this case, a method for adjusting a specific parameter among parameters configured for the UE according to the sidelink characteristic needs to be proposed.

Technical Solutions

In one embodiment, a method for performing, by a first device, wireless communication is provided. The method may comprise: transmitting, to a second device, a measurement configuration including a measurement object, a measurement identity, a reporting configuration and a quantity configuration, wherein the reporting configuration includes information related to a first report interval; and receiving, from the second device based on the first report interval, a plurality of measurement report messages including measurement results obtained based on the measurement configuration, wherein the first report interval is determined by the first device.

In one embodiment, a first device configured to perform wireless communication is provided. The first device may comprise: one or more memories storing instructions; one or more transceivers; and one or more processors connected to the one or more memories and the one or more transceivers. The one or more processors may execute the instructions to: transmit, to a second device, a measurement configuration including a measurement object, a measurement identity, a reporting configuration and a quantity configuration, wherein the reporting configuration includes information related to a first report interval; and receive, from the second device based on the first report interval, a plurality of measurement report messages including measurement results obtained based on the measurement configuration, wherein the first report interval is determined by the first device.

Effects of the Disclosure

The user equipment (UE) may efficiently perform SL communication.

DESCRIPTION OF EXEMPLARY EMBODIMENTS

Figure 1:
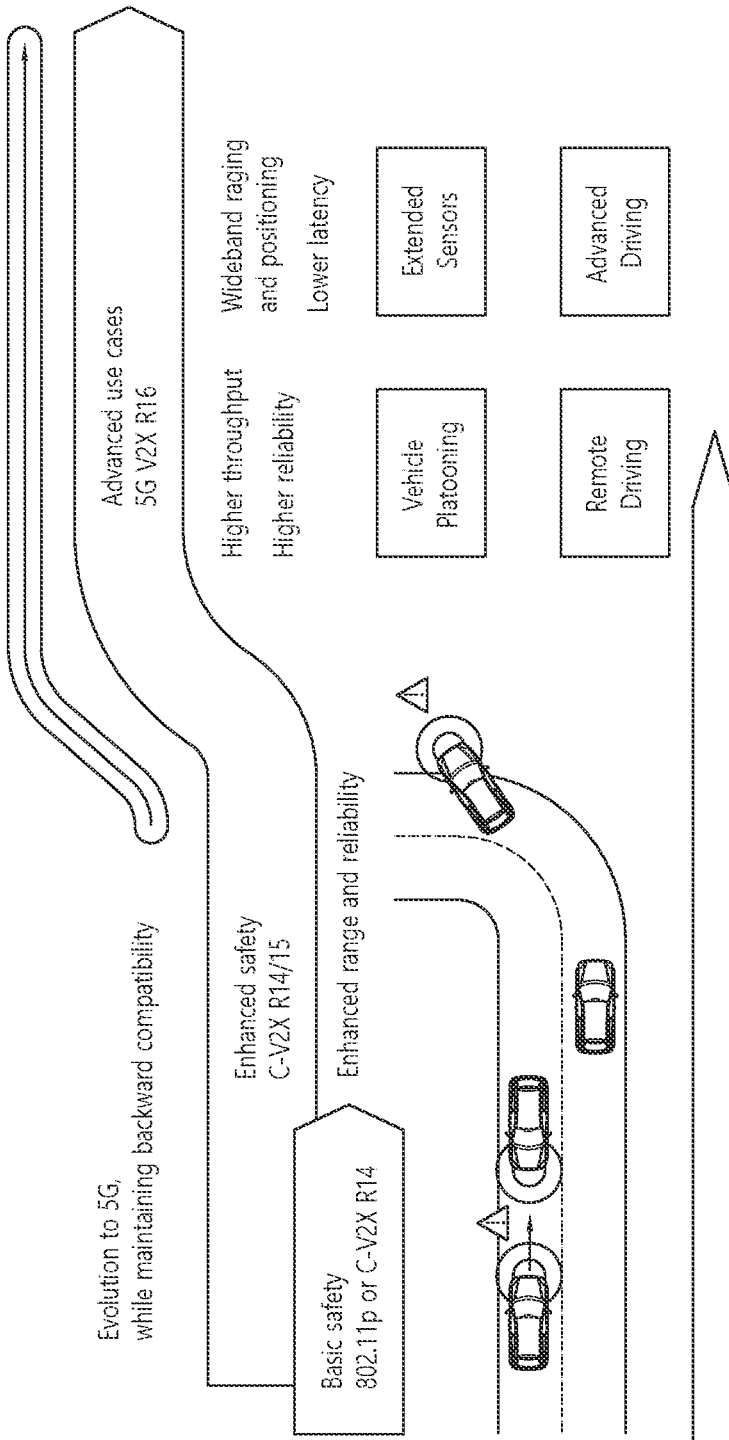
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
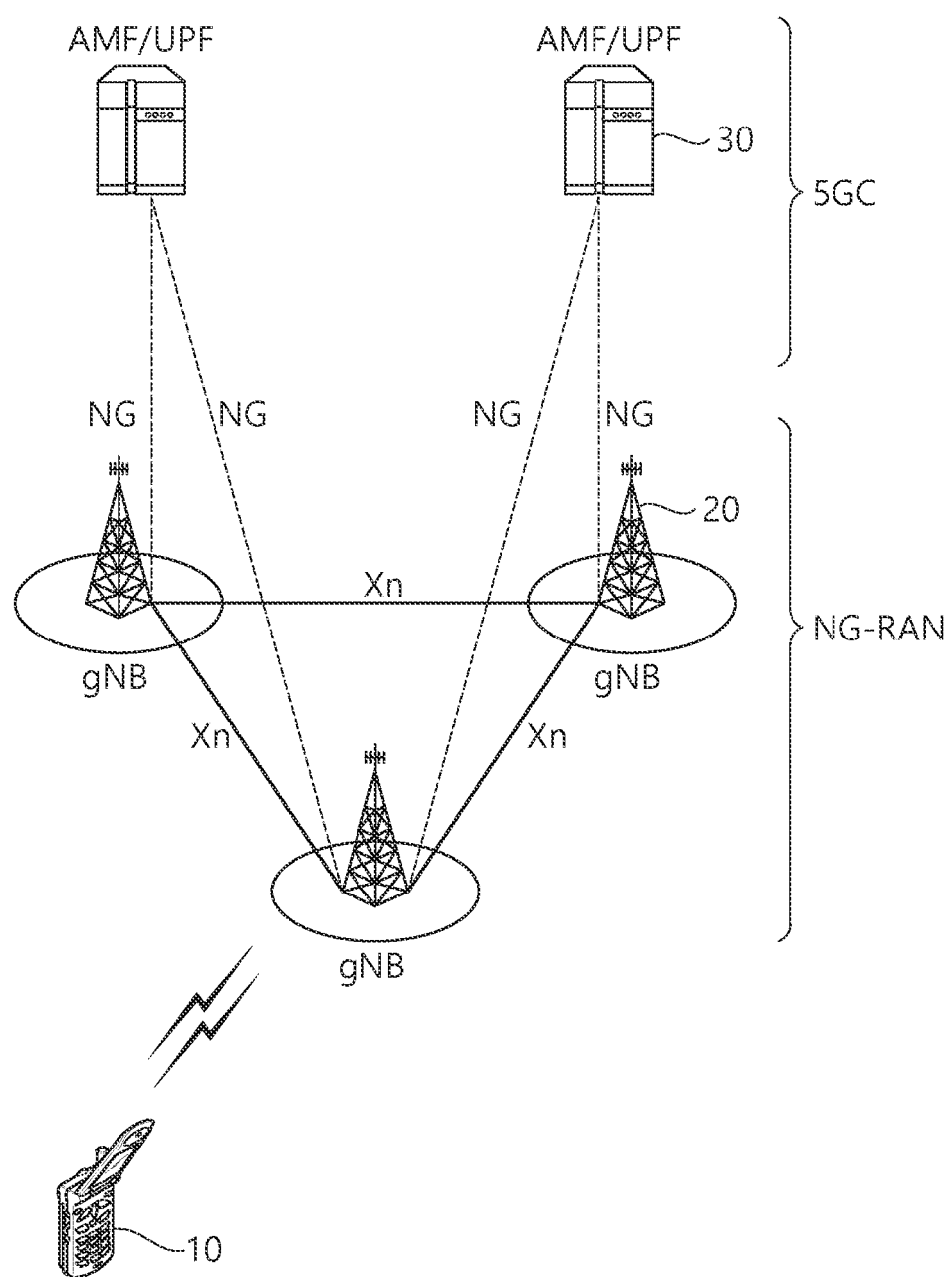
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
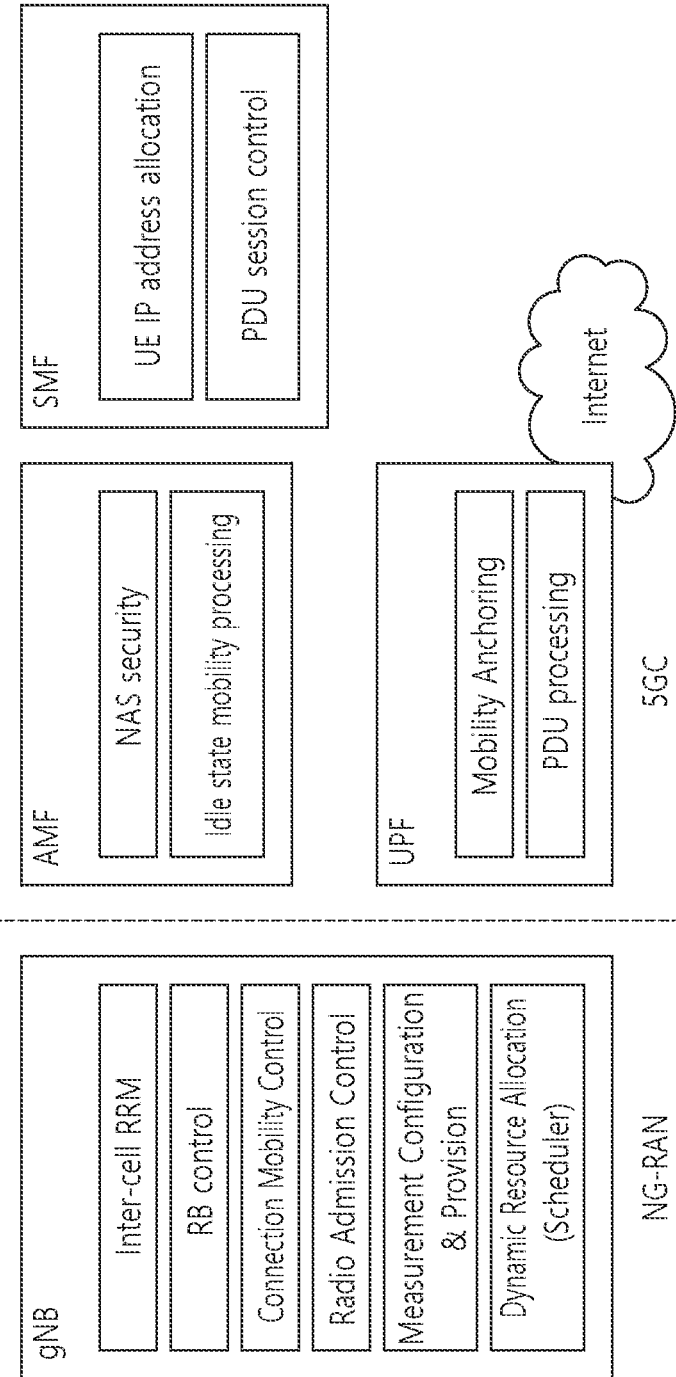
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
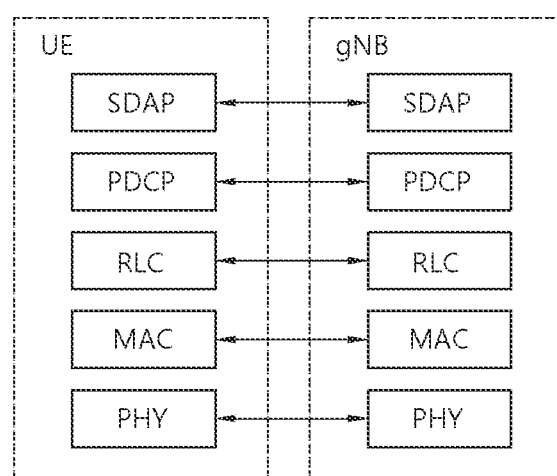
FIG. 4 shows a radio protocol architecture, based on an embodiment of the present disclosure.
Figure 4:
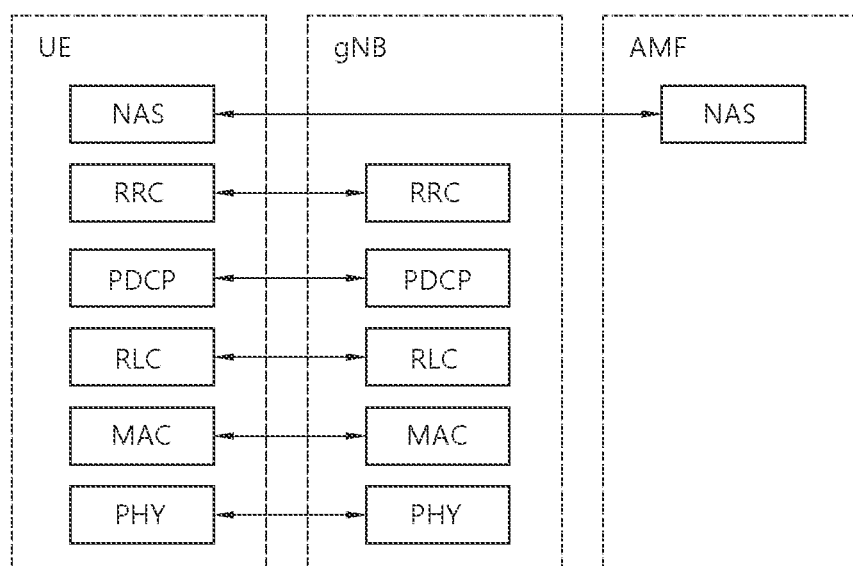

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
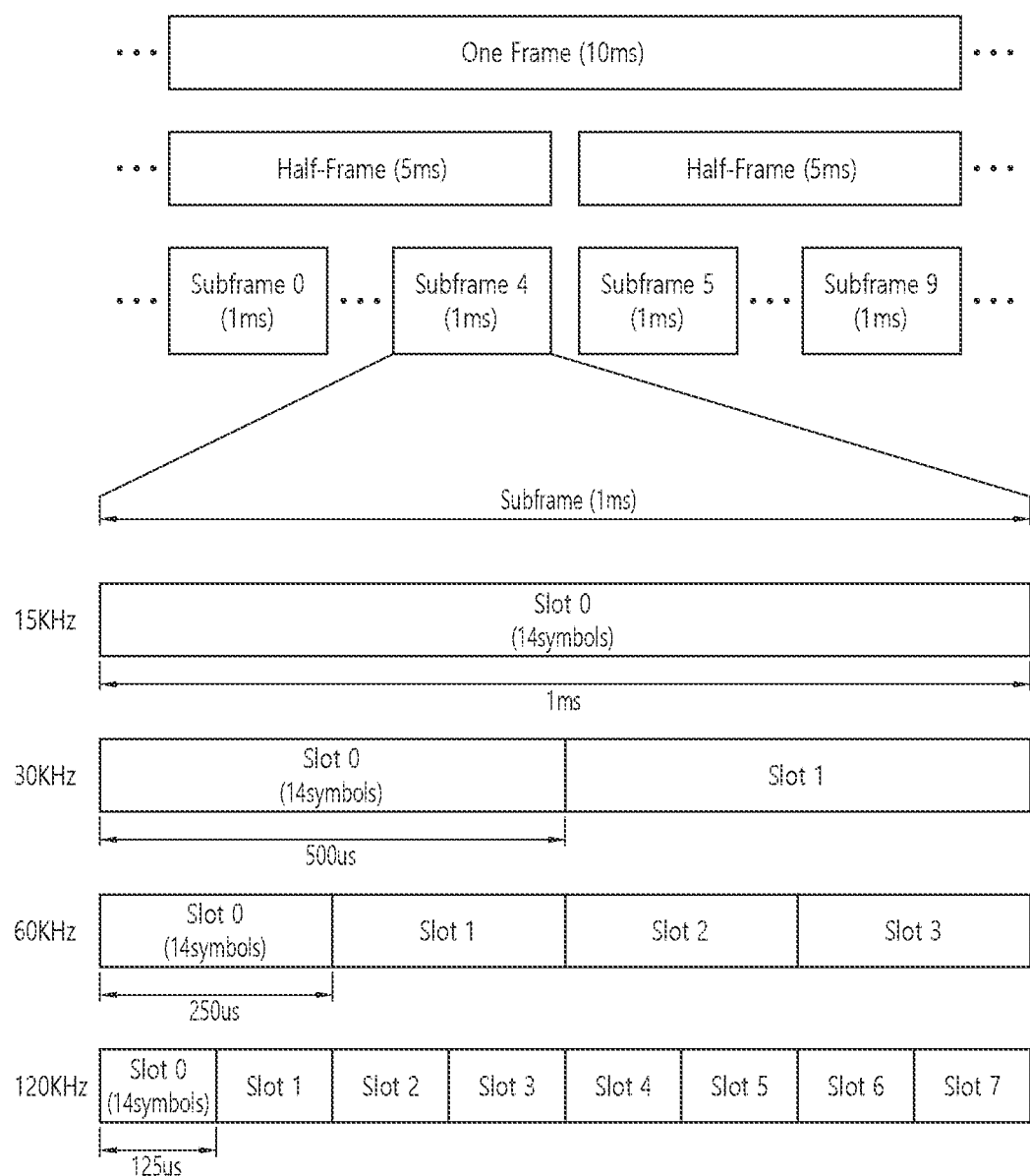
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
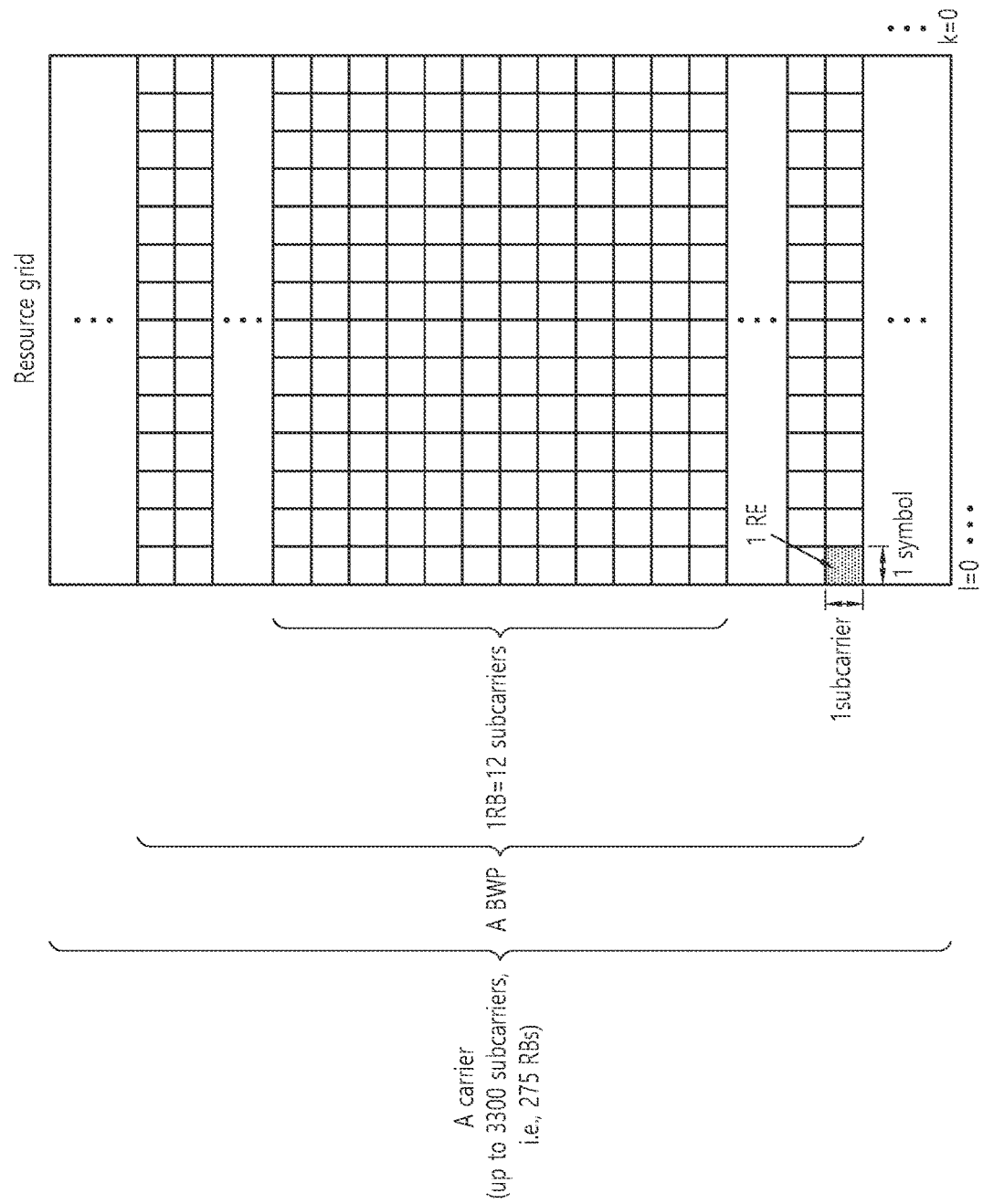
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
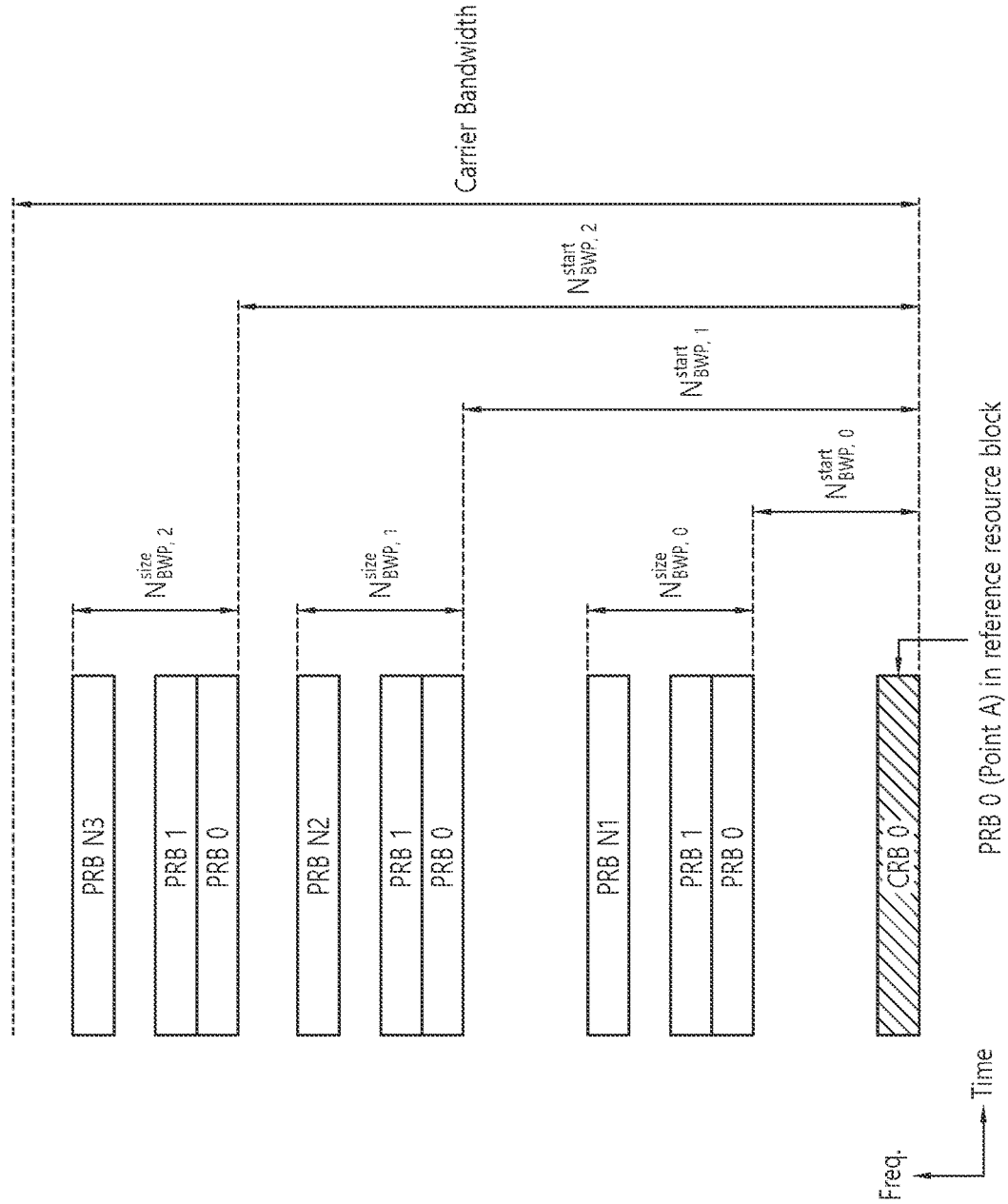
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
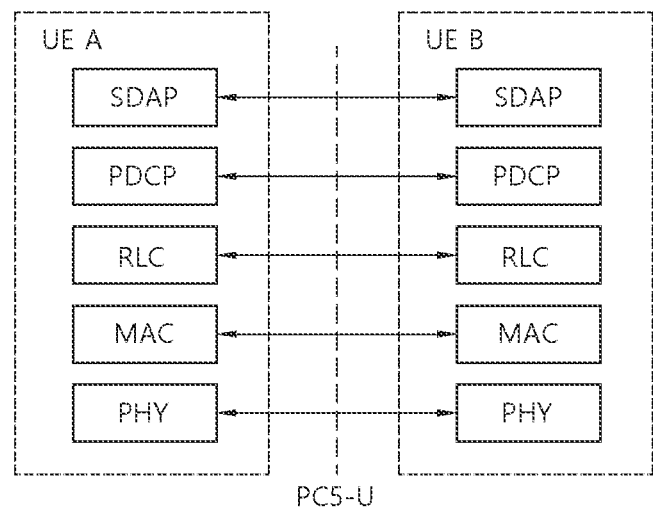
FIG. 8 shows a radio protocol architecture for a SL communication, based on an embodiment of the present disclosure.
Figure 8:
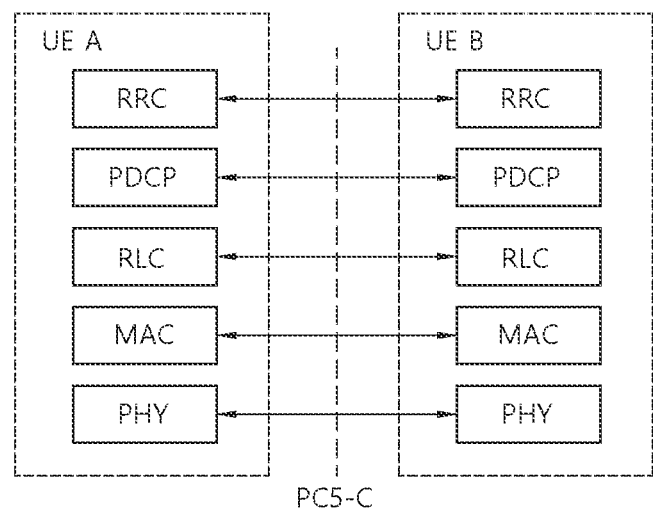

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
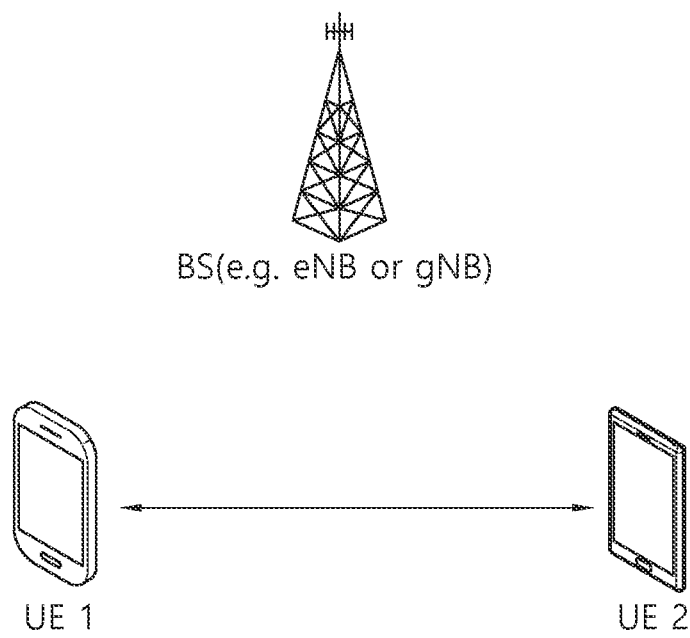
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
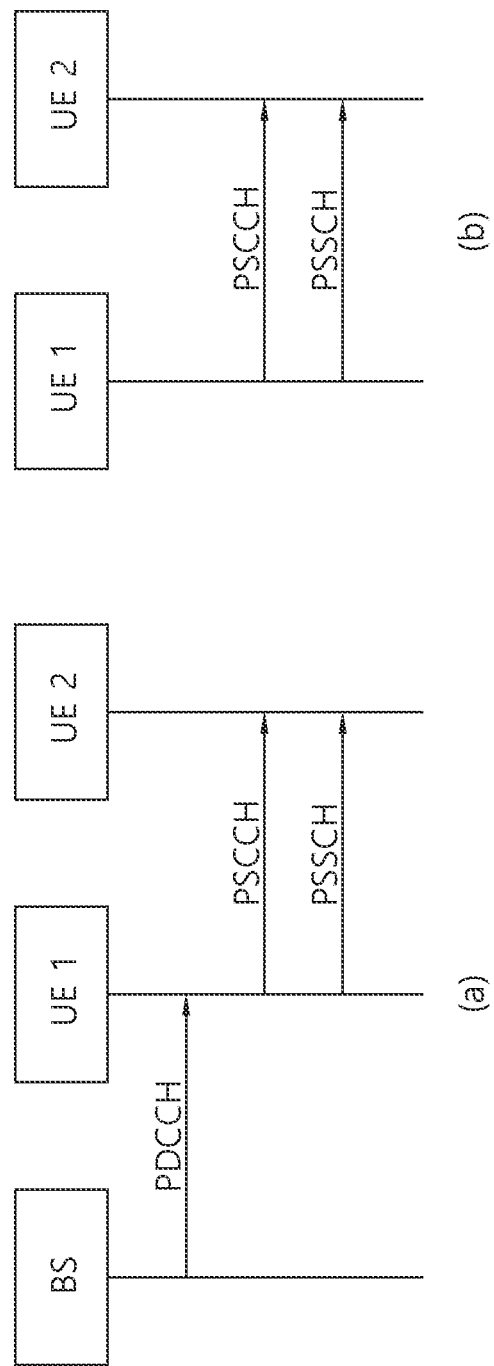
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
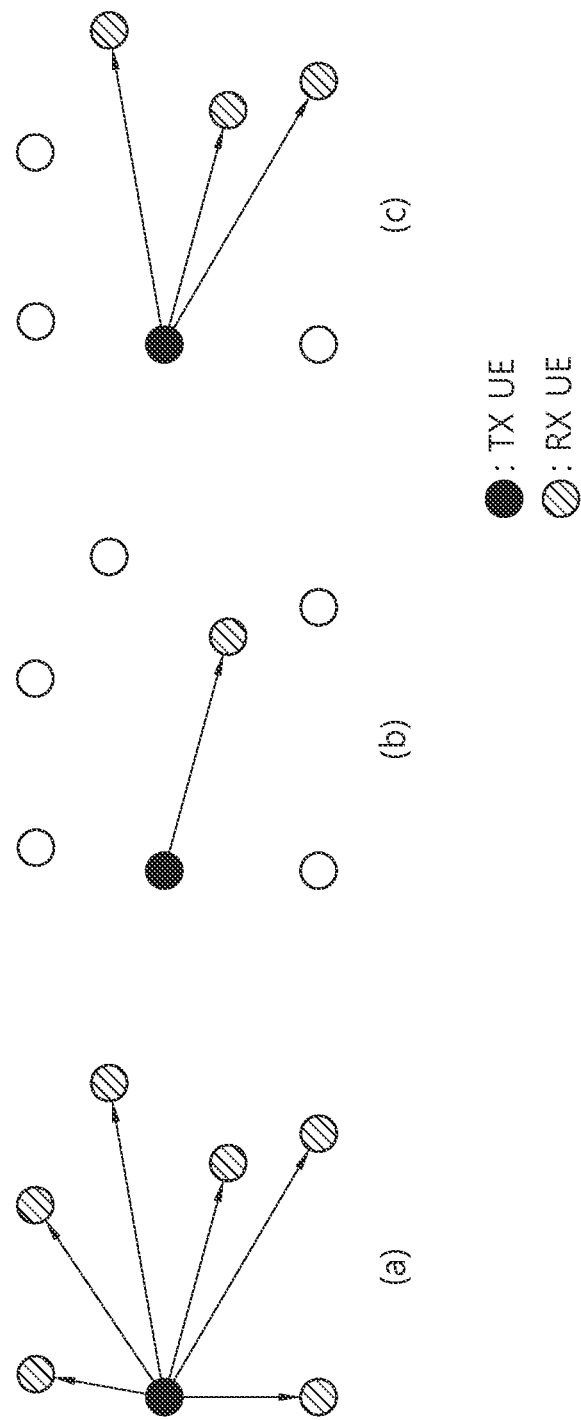
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, SL measurement and reporting will be described.

For the purpose of QoS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel status information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 12:
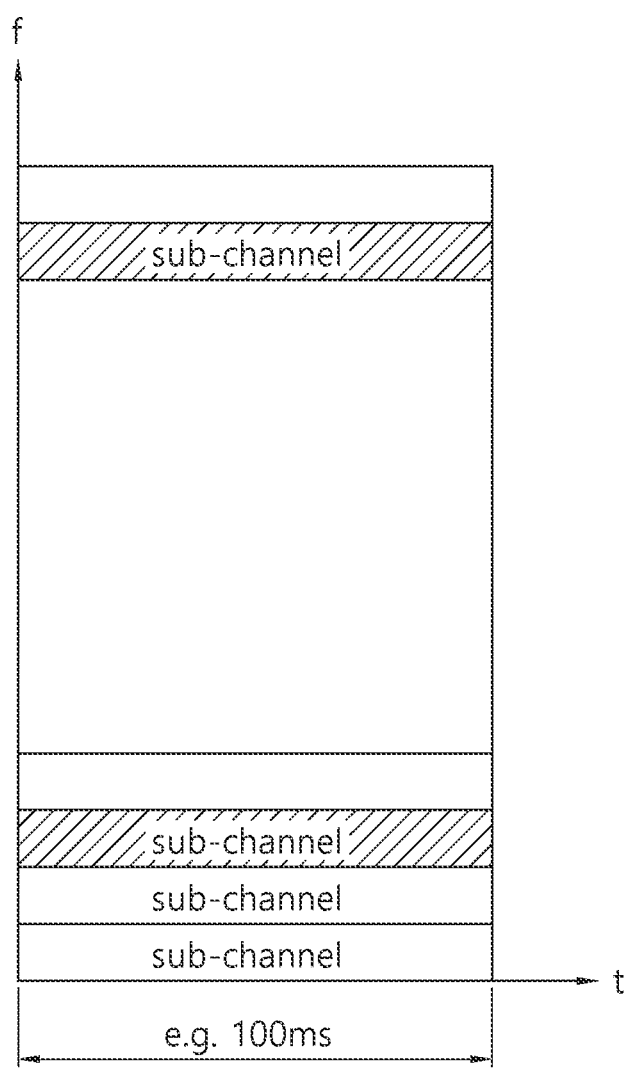
FIG. 12 shows a resource unit for CBR measurement, based on an embodiment of the present disclosure.

FIG. 12 shows a resource unit for CBR measurement, based on an embodiment of the present disclosure. The embodiment of FIG. 12 may be combined with various embodiments of the present disclosure.

Referring to FIG. 12, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 12, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Figure 13:
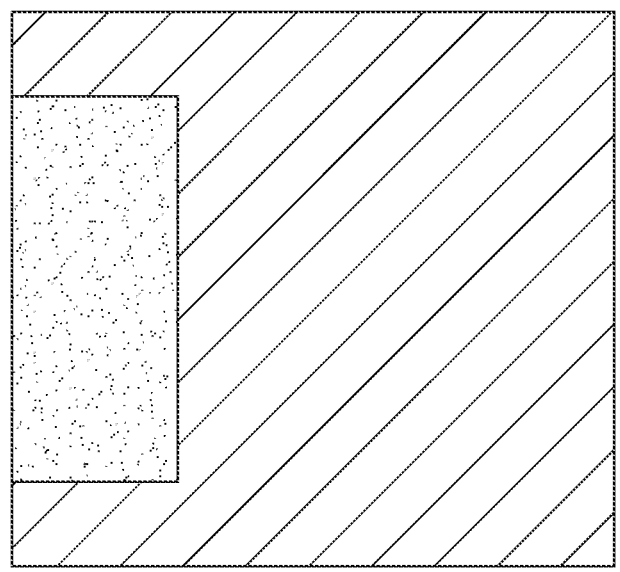
FIG. 13 shows a case in which a PSCCH and a PSSCH are multiplexed, based on an embodiment of the present disclosure.

FIG. 13 shows a case in which a PSCCH and a PSSCH are multiplexed, based on an embodiment of the present disclosure. The embodiment of FIG. 13 may be combined with various embodiments of the present disclosure.

Referring to FIG. 13, if the PSCCH and the PSSCH are multiplexed, the UE may perform one CBR measurement for one resource pool. Herein, if a PSFCH resource is configured or pre-configured, the PSFCH resource may be excluded from the CBR measurement.

Further, congestion control considering a priority of traffic (e.g., packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Meanwhile, in NR V2X, information on RSRP (hereinafter, information on SL-RSRP) may be reported between UEs performing sidelink communication. For example, information on SL-RSRP may be a SL-RSRP value. For example, the RX UE may measure SL-RSRP based on signal(s) transmitted by the TX UE, and the RX UE may transmit information on SL-RSRP to the TX UE. Unlike an operation in which a UE reports an RSRP value of a cell to which it belongs or a neighbor cell through a legacy Uu interface to the base station for Radio Resource Management (RRM) purpose, the RX UE may report information on SL-RSRP to the TX UE for power control of the TX UE. For example, if the RX UE reports the SL-RSRP value measured based on the signal(s) transmitted by the TX UE to the TX UE, the TX UE may compare transmit power of the TX UE with the SL-RSRP value received from the RX UE. For example, the TX UE may calculate/obtain a pathloss between the TX UE and the RX UE based on transmit power of the TX UE and the SL-RSRP value received from the RX UE. In addition, the TX UE may control transmit power based on the pathloss.

Meanwhile, in NR Uu, the base station may configure configuration for RSRP measurement and/or reporting to the UE through an RRC message. In addition, for example, the UE may measure a channel state (e.g., RSRP) between the UE and the base station based on the configuration for RSRP measurement and/or reporting. In addition, for example, the UE may report the measured channel state to the base station by using resource(s) configured by the base station. For example, in NR Uu, the configuration for measurement and/or reporting transmitted by the base station to the UE may refer to 3GPP TS 38.331 V15.7.0 (2019-09). Among them, Table 5 shows parameters included in the measurement configuration.

TABLE 5

1. Measurement objects: A list of objects on which the UE shall perform the measurements.

For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

The measObjectId of the MO which corresponds to each serving cell is indicated by servingCellMO within the serving cell configuration.

For inter-RAT E-UTRA measurements a measurement object is a single E-UTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

2. Reporting configurations: A list of reporting configurations where there can be one or multiple reporting configurations per measurement object. Each reporting configuration consists of the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g. RSRP) and other associated information such as the maximum number of cells and the maximum number beams per cell to report.

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

Referring to Table 5, the measurement configuration transmitted by the base station to the UE may include at least one of measurement objects, reporting configurations, measurement identities, quantity configurations, and/or measurement gaps.

Meanwhile, in sidelink, parameters for the UE to perform SL-RSRP measurement/reporting and/or Channel Status Information (CSI) measurement/reporting to other UEs need to be configured for the UE. For example, the UE may receive parameters for performing SL-RSRP measurement/reporting and/or CSI measurement/reporting through PC5-RRC signaling. However, parameters configured for the UE in the sidelink may be different from parameters configured for the UE in the legacy NR Uu. For example, it may be sufficient that SL-RSRP measurement/reporting and/or CSI measurement/reporting for sidelink communication is performed between two UEs performing unicast communication. In addition, since the RX UE itself performs resource occupation for performing SL-RSRP reporting and/or CSI reporting to the TX UE, tight configuration as in NR Uu may not be required. For example, for SL-RSRP measurement and/or periodic reporting between UEs in sidelink, parameters configured for the UE may include a reporting period (e.g., a part of the reporting configuration in Table 5 above). For example, for SL-RSRP measurement and/or aperiodic reporting between UEs in sidelink, parameters configured for the UE may include a reporting criterion (e.g., a part of the reporting configuration in Table 5 above). For example, for CSI measurement and/or reporting between UEs in sidelink, parameters configured for the UE may include a Channel Quality Indicator (CQI) table and/or rank information for RI reporting.

Based on various embodiments of the present disclosure, a method for adjusting a parameter configured for a UE and an apparatus supporting the same will be described. For example, if the UE reports a SL-RSRP measurement result to another UE periodically or aperiodically, a method for adjusting a specific parameter among parameters configured for the UE based on sidelink characteristics and an apparatus supporting the same will be described.

For example, the base station may configure at least one of a reporting criterion, an RS type, and/or a reporting format to the UE through a reporting configuration. For example, the base station may transmit the reporting configuration including at least one of the reporting criterion, the RS type, and/or the reporting format to the UE. Tables 6 to 9 show examples of the reporting configuration. Tables 6 to 9 may refer to section 6.3.2 of 3GPP TS 38.331 V15.7.0 (2019-09).

TABLE 6

ReportConfigNR
The IE ReportConfigNR specifies criteria for triggering of an NR measurement reporting event.
Measurement reporting events are based on cell measurement results, which can either be derived
based on SS/PBCH block or CSI-RS. These events are labelled AN with N equal to 1, 2 and so on.
Event A1:     Serving becomes better than absolute threshold;
Event A2:     Serving becomes worse than absolute threshold;
Event A3:     Neighbour becomes amount of offset better than PCell/PSCell;
Event A4:     Neighbour becomes better than absolute threshold;
Event A5:     PCell/PSCell becomes worse than absolute threshold1 AND Neighbour/SCell
becomes better than another absolute threshold2;
Event A6:     Neighbour becomes amount of offset better than SCell.
                      ReportConfigNR information element
-- ASN1START
-- TAG-REPORTCONFIGNR-START
ReportConfigNR ::=                    SEQUENCE {
  reportType                             CHOICE {
    periodical                             PeriodicalReportConfig,
    eventTriggered                         EventTriggerConfig,
    ...,
    reportCGI                              ReportCGI,
    reportSFTD                             ReportSFTD-NR
  }
}
ReportCGI ::=                         SEQUENCE {
  cellForWhichToReportCGI                PhysCellId,
  ...
}
ReportSFTD-NR ::=                     SEQUENCE {
  reportSFTD-Meas                        BOOLEAN,
  reportRSRP                             BOOLEAN,
  ...,
  [[
  reportSFTD-NeighMeas                                    ENUMERATED {true}
OPTIONAL,   -- Need R
  drx-SFTD-NeighMeas                                      ENUMERATED {true}
OPTIONAL,   -- Need R
  cellsForWhichToReportSFTD              SEQUENCE (SIZE (1..maxCellSFTD)) OF
PhysCellId   OPTIONAL   -- Need R
  ]]
}

TABLE 7

```
EventTriggerConfig::=          SEQUENCE {
    eventId                        CHOICE {
        eventA1                        SEQUENCE {
            a1-Threshold                   MeasTriggerQuantity,
            reportOnLeave                  BOOLEAN,
            hysteresis                     Hysteresis,
            timeToTrigger                  TimeToTrigger
        },
        eventA2                        SEQUENCE {
            a2-Threshold                   MeasTriggerQuantity,
            reportOnLeave                  BOOLEAN,
            hysteresis                     Hysteresis,
            timeToTrigger                  TimeToTrigger
        },
        eventA3                        SEQUENCE {
            a3-Offset                      MeasTriggerQuantityOffset,
            reportOnLeave                  BOOLEAN,
            hysteresis                     Hysteresis,
            timeToTrigger                  TimeToTrigger,
            useWhiteCellList               BOOLEAN
        },
        eventA4                        SEQUENCE {
            a4-Threshold                   MeasTriggerQuantity,
            reportOnLeave                  BOOLEAN,
            hysteresis                     Hysteresis,
            timeToTrigger                  TimeToTrigger,
            useWhiteCellList               BOOLEAN
        },
        eventA5                        SEQUENCE {
            a5-Threshold1                  MeasTriggerQuantity,
            a5-Threshold2                  MeasTriggerQuantity,
            reportOnLeave                  BOOLEAN,
            hysteresis                     Hysteresis,
            timeToTrigger                  TimeToTrigger,
            useWhiteCellList               BOOLEAN
        },
        eventA6                        SEQUENCE {
            a6-Offset                      MeasTriggerQuantityOffset,
            reportOnLeave                  BOOLEAN,
            hysteresis                     Hysteresis,
            timeToTrigger                  TimeToTrigger,
            useWhiteCellList               BOOLEAN
        },
        ...
    },
    rsType                         NR-RS-Type,
    reportInterval                 ReportInterval,
    reportAmount                   ENUMERATED {r1, r2, r4, r8,
r16, r32, r64, infinity},
    reportQuantityCell             MeasReportQuantity,
    maxReportCells                 INTEGER (1..maxCellReport),
    reportQuantityRS-Indexes       MeasReportQuantity
OPTIONAL,  -- Need R
    maxNrofRS-IndexesToReport      INTEGER
(1..maxNrofIndexesToReport)    OPTIONAL,  -- Need R
    includeBeamMeasurements        BOOLEAN,
    reportAddNeighMeas             ENUMERATED {setup}
OPTIONAL,  -- Need R
    ...
}
```

TABLE 8

```
PeriodicalReportConfig ::=     SEQUENCE {
    rsType                         NR-RS-Type,
    reportInterval                 ReportInterval,
    reportAmount                   ENUMERATED {r1, r2, r4, r8,
r16, r32, r64, infinity},
    reportQuantityCell             MeasReportQuantity,
    maxReportCells                 INTEGER (1..maxCellReport),
    reportQuantityRS-Indexes       MeasReportQuantity
OPTIONAL,  -- Need R
    maxNrofRS-IndexesToReport      INTEGER
(1..maxNrofIndexesToReport)    OPTIONAL,  -- Need R
    includeBeamMeasurements        BOOLEAN,
    useWhiteCellList               BOOLEAN,
    ...
}
NR-RS-Type ::=                 ENUMERATED {ssb, csi-rs}
MeasTriggerQuantity ::=        CHOICE {
    rsrp                           RSRP-Range,
    rsrq                           RSRQ-Range,
    sinr                           SINR-Range
}
MeasTriggerQuantityOffset ::=  CHOICE {
    rsrp                           INTEGER (-30..30),
    rsrq                           INTEGER (-30..30),
    sinr                           INTEGER (-30..30)
}
MeasReportQuantity ::=         SEQUENCE {
    rsrp                           BOOLEAN,
    rsrq                           BOOLEAN,
    sinr                           BOOLEAN
}
```

TABLE 9

ReportConfigNR field descriptions reportType
Type of the configured measurement report. In EN-DC, network does not configure report of type reportCGI using SRB3.
EventTriggerConfig field descriptions a3-Offset/a6-Offset
Offset value(s) to be used in NR measurement report triggering condition for event a3/a6. The actual value is field value * 0.5 dB.
aN-ThresholdM
Threshold value associated to the selected trigger quantity (e.g. RSRP, RSRQ, SINR) per RS Type (e.g. SS/PBCH block, CSI-RS) to be used in NR measurement report triggering condition for event number aN. If multiple thresholds are defined for event number aN, the thresholds are differentiated by M. The network configures aN-Threshold1 only for events A1, A2, A4, A5 and a5-Threshold2 only for event A5. In the same eventA5, the network configures the same quantity for the MeasTriggerQuantity of the a5-Threshold1 and for the MeasTriggerQuantity of the a5-Threshold2.
eventId
Choice of NR event triggered reporting criteria.
maxNrofRS-IndexesToReport
Max number of RS indexes to include in the measurement report for A1-A6 events.
maxReportCells
Max number of non-serving cells to include in the measurement report.
reportAddNeighMeas
Indicates that the UE shall include the best neighbour cells per saving frequency.
reportAmount
Number of measurement reports applicable for eventTriggered as well as for periodical report types.
reportOnLeave
Indicates whether or not the UE shall initiate the measurement reporting procedure when the leaving condition is met for a cell in TABLE 9-continued cellsTriggeredList, as specified in 5.5.4.1.
reportQuantityCell
The cell measurement quantities to be included in the measurement report.
reportQuantityRS-Indexes
Indicates which measurement information per RS index the UE shall include in the measurement report.
timeToTrigger
Time during which specific criteria for the event needs to be met in order to trigger a measurement report.
useWhiteCellList
Indicates whether only the cells included in the white-list of the associated measObject are applicable as specified in 5.5.4.1.

PeriodicalReportConfig field descriptions maxNrofRS-IndexesToReport
Max number of RS indexes to include in the measurement report.
maxReportCells
Max number of non-serving cells to include in the measurement report.
reportAmount
Number of measurement reports applicable for eventTriggered as well as for periodical report types
reportQuantityCell
The cell measurement quantities to be included in the measurement report.
reportQuantityRS-Indexes
Indicates which measurement information per RS index the UE shall include in the measurement report.
useWhiteCellList
Indicates whether only the cells included in the white-list of the associated measObject are applicable as specified in 5.5.4.1.

ReportSFTD-NR field descriptions cellForWhichToReportSFTD
Indicates the target NR neighbour cells for SFTD measurement between PCell and NR neighbour cells.
drx-SFTD-NeighMeas
Indicates that the UE shall use available idle periods (i.e. DRX off periods) for the SFTD measurement in NR standalone. The network only includes drx-SFTD-NeighMeas field when reprtSFTD-NeighMeas is set to true.
reportSFTD-Meas
Indicates whether UE is required to perform SFTD measurement between PCell and NR PSCell in NR-DC.
reportSFTD-NeighMeas
Indicates whether UE is required to perform SFTD measurement between PCell and NR neighbour cells in NR standalone. The network
does not include this field if reportSFTD-Meas is set to true.
reportRSRP
Indicates whether UE is required to include RSRP result of NR PSCell in SFTD measurement result, derived based on SSB. If it is set to
true, the network should ensure that ssb-ConfigMobility is included in the measurement object for NR PSCell.

Referring to Tables 6 to 9, the base station may configure for the UE whether the UE performs a report on measurement (e.g., RSRP) periodically or based on an event triggered. In addition, the base station may configure a configuration for periodic reporting (PeriodicalReportConfig) and a configuration for an event trigger-based report (EventTriggerConfig) for the UE. In this case, if the base station configures the UE such that the UE performs periodic reporting, the base station may configure a report interval (reportInterval) for the UE. For example, the report interval may refer to Table 10.

TABLE 10

ReportInterval
The IE ReportInterval indicates the interval between periodical reports. The ReportInterval is
applicable if the UE performs periodical reporting (i.e. when reportAmount exceeds 1), for
triggerTypeevent as well as for triggerTypeperiodical. Value ms120 corresponds to 120 ms, value
ms240 corresponds to 240 ms and so on, while value min1 corresponds to 1 min, min6 corresponds
to 6 min and so on.
ReportInterval information element
-- ASN1START
-- TAG-REPORTINTERVAL-START
ReportInterval ::=              ENUMERATED {ms120, ms240, ms480, ms640, ms1024,
ms2048, ms5120, ms10240, ms20480, ms40960, min1, min6, min12, min30 }

-- TAG-REPORTINTERVAL-STOP
-- ASN1STOP

Referring to Table 10, the report interval (reportInterval) may be information on an interval between periodic reports.

Meanwhile, in sidelink communication, if the RX UE periodically reports information on RSRP to the TX UE, the TX UE may configure a report interval to the RX UE. For example, information on RSRP may be an RSRP value. For example, the RX UE may measure RSRP between the TX UE and the RX UE based on signal(s) transmitted by the TX UE. For convenience of description, a case in which the RX UE measures RSRP is mainly described, but the technical idea of the present disclosure is not limited thereto. For example, even when the RX UE measures a channel state based on signal(s) transmitted by the TX UE, various embodiments of the present disclosure can be applied. Hereinafter, in consideration of the characteristics of V2X communication, based on various embodiments of the present disclosure, a method for the TX UE to configure a report interval to the RX UE will be described.

Figure 14:
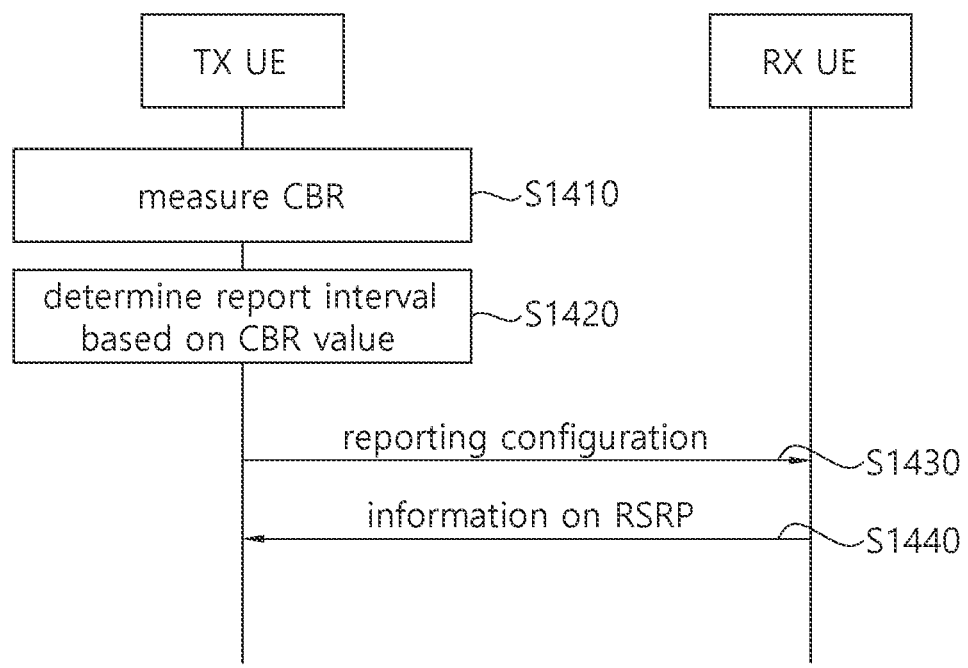
FIG. 14 shows a procedure for a TX UE to configure a report interval to an RX UE based on CBR, based on an embodiment of the present disclosure.

FIG. 14 shows a procedure for a TX UE to configure a report interval to an RX UE based on CBR, based on an embodiment of the present disclosure. The embodiment of FIG. 14 may be combined with various embodiments of the present disclosure.

Referring to FIG. 14, in step S1410, the TX UE may measure CBR. For example, the TX UE may measure the CBR for a resource pool. For example, the TX UE may measure the CBR for a BWP. For example, the TX UE may measure the CBR for a carrier. For example, the TX UE may measure the CBR periodically. For example, as the CBR value measured by the TX UE increases, it may mean that the environment of the channel through which the TX UE performs SL communication is poor. For example, the larger the CBR value measured by the TX UE, the higher the congestion level of the channel through which the TX UE performs SL communication. For example, as the CBR value measured by the TX UE is smaller, it may mean that the environment of the channel through which the TX UE performs SL communication is good. For example, the smaller the CBR value measured by the TX UE, the lower the congestion level of the channel through which the TX UE performs SL communication.

In step S1420, the TX UE may configure/determine/adjust the report interval differently based on the Channel Busy Ratio (CBR) value measured by the TX UE. For example, the report interval may be a period in which the RX UE reports information on RSRP measured by the RX UE to the TX UE.

For example, if the CBR value measured by the TX UE is large, the TX UE may configure/determine/adjust the report interval to be long. For example, if the CBR value measured by the TX UE is greater than or equal to a pre-configured threshold, the TX UE may configure/determine/adjust the report interval to be long. In this case, the RX UE may report information on RSRP to the TX UE in a long period. This is because resource allocation for RSRP reporting of the RX UE may increase channel congestion. Of course, if the RX UE has data to be transmitted and the RX UE secures a sufficient grant for RSRP reporting, additional resource allocation may not be required for the RX UE. However, if the RX UE does not have data to be transmitted, or if the RX UE does not secure a sufficient grant for RSRP reporting, additional resource allocation may be required for the RX UE.

For example, if the CBR value measured by the TX UE is small, the TX UE may configure/determine/adjust the report interval to be short. For example, if the CBR value measured by the TX UE is less than or equal to a pre-configured threshold, the TX UE may configure/determine/adjust the report interval to be short. In this case, the RX UE may report information on RSRP to the TX UE in a short period.

In step S1430, the TX UE may transmit/configure a report configuration to the RX UE. For example, the report configuration may include the report interval. For example, the report interval may be configured/determined/adjusted based on the CBR measured by the TX UE.

In step S1440, the RX UE may perform RSRP measurement based on the report configuration. In addition, for example, the RX UE may transmit information on RSRP to the TX UE based on the report interval.

Based on an embodiment of the present disclosure, the TX UE may configure the report interval to the RX UE differently based on the CBR measured by the TX UE, and the RX UE may report information on RSRP to the TX UE based on the report interval.

Figure 15:
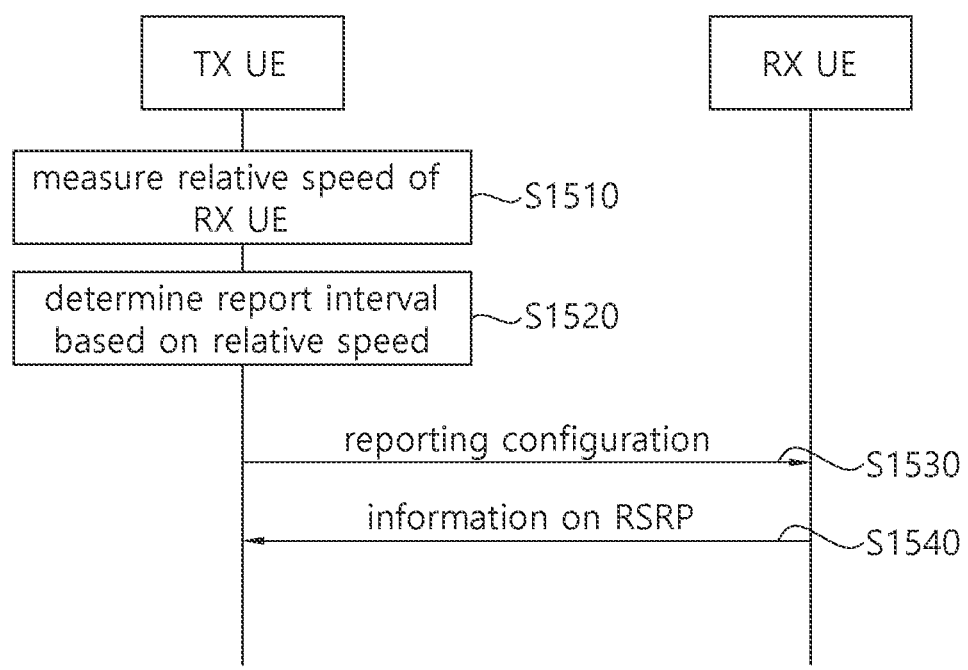
FIG. 15 shows a procedure for a TX UE to configure a report interval to an RX UE based on a relative speed of the RX UE, based on an embodiment of the present disclosure.

FIG. 15 shows a procedure for a TX UE to configure a report interval to an RX UE based on a relative speed of the RX UE, based on an embodiment of the present disclosure. The embodiment of FIG. 15 may be combined with various embodiments of the present disclosure.

Referring to FIG. 15, in step S1510, the TX UE may measure/determine the relative speed of the RX UE. For example, the relative speed may mean a relative speed between the TX UE and the RX UE. For example, unlike legacy NR Uu communication, sidelink communication may include V2X communication between vehicles with speed. Therefore, considering the characteristics of a vehicle with speed, parameter adjustment according to the speed of the vehicle may be an important part in V2X communication. For example, the RX UE may be a peer UE performing unicast communication with the TX UE. For example, the TX UE may determine the relative speed between the TX UE and the RX UE through the reception of a CAM message or other V2X message transmitted by the RX UE.

In step S1520, the TX UE may configure/determine/adjust the report interval differently based on the relative speed of the RX UE. For example, the report interval may be a period in which the RX UE reports information on RSRP measured by the RX UE to the TX UE.

For example, if the relative speed of the RX UE is fast, the TX UE may configure/determine/adjust the report interval to be long. For example, if the relative speed of the RX UE is greater than or equal to a threshold, the TX UE may configure/determine/adjust the report interval to be long. For example, if the relative speed of the RX UE is fast, the distance between the TX UE and the RX UE may increase after a certain time depending on the speed difference between the TX UE and the RX UE. Therefore, it may be meaningless for the RX UE to report information on RSRP to the TX UE in a short interval. That is, since there is a high probability that the unicast communication between the TX UE and the RX UE is cut off, it may be meaningless for the RX UE to report information on RSRP to the TX UE in a short interval. Therefore, if the relative speed of the RX UE is fast, the TX UE may configure/determine/adjust the report interval to be long. In this case, the RX UE may report information on RSRP to the TX UE in a long period.

For example, if the relative speed of the RX UE is slow, the TX UE may configure/determine/adjust the report interval to be short. For example, if the relative speed of the RX UE is less than or equal to a threshold, the TX UE may configure/determine/adjust the report interval to be short. For example, if the relative speed of the RX UE is slow, since the speed difference between the TX UE and the RX UE is small, there is a high probability that the unicast communication between the TX UE and the RX UE is maintained. Therefore, so that the TX UE can perform appropriate power control based on information on RSRP transmitted by the RX UE, the TX UE may configure/determine/adjust the report interval to be short. In this case, the RX UE may report information on RSRP to the TX UE in a short period.

In step S1530, the TX UE may transmit/configure a report configuration to the RX UE. For example, the report configuration may include the report interval. For example, the report interval may be configured/determined/adjusted based on the relative speed of the RX UE.

In step S1540, the RX UE may perform RSRP measurement based on the report configuration. In addition, for example, the RX UE may transmit information on RSRP to the TX UE based on the report interval.

Based on an embodiment of the present disclosure, the TX UE may configure the report interval to the RX UE differently based on the relative speed of the RX UE, and the RX UE may report information on RSRP to the TX UE based on the report interval.

Figure 16:
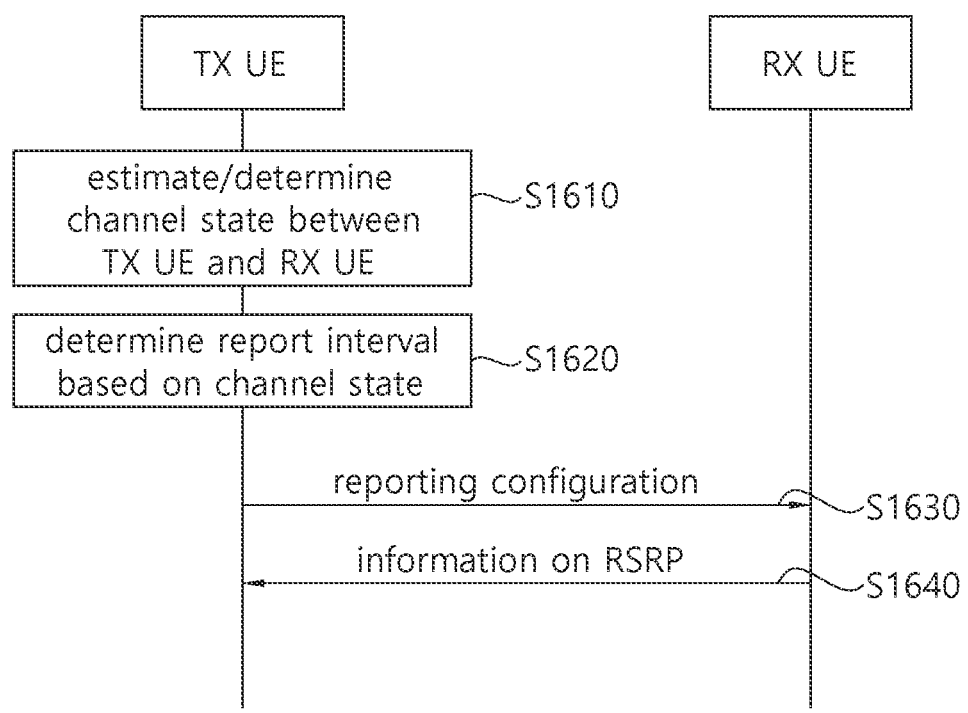
FIG. 16 shows a procedure for a TX UE to configure a report interval to an RX UE based on a channel state, based on an embodiment of the present disclosure.

FIG. 16 shows a procedure for a TX UE to configure a report interval to an RX UE based on a channel state, based on an embodiment of the present disclosure. The embodiment of FIG. 16 may be combined with various embodiments of the present disclosure.

Referring to FIG. 16, in step S1610, the TX UE may measure/estimate/determine a channel state for the RX UE. For example, the TX UE may measure/estimate/determine the channel state between the TX UE and the RX UE. For example, the RX UE may be a peer UE performing unicast communication with the TX UE. For example, in sidelink communication, for power control of the TX UE performing unicast communication with the RX UE, the RX UE may report information on SL-RSRP to the TX UE. Therefore, in order to determine whether the TX UE performs more or less power control, the TX UE may importantly consider the channel state between the TX UE and the RX UE. For example, the TX UE may measure/estimate/determine RSRP between the TX UE and the RX UE through Reference Signal(s) (RS(s)) included in each other's data exchange in sidelink communication with the RX UE.

In step S1620, the TX UE may configure/determine/adjust the report interval differently based on the channel state for the RX UE. For example, the report interval may be a period in which the RX UE reports information on RSRP measured by the RX UE to the TX UE.

For example, if the RSRP value measured by the TX UE (e.g., the RSRP estimate value) is greater than a first threshold, the TX UE may configure/determine/adjust the report interval to be short. For example, if the RSRP value measured by the TX UE (e.g., the RSRP estimate value) is less than a second threshold, the TX UE may configure/determine/adjust the report interval to be short. For example, the first threshold may be greater than the second threshold. In this case, for example, if the RSRP value measured by the TX UE is greater than the first threshold, the TX UE may reduce transmit power, and may request the RX UE to report RSRP for power control. For example, if the RSRP value measured by the TX UE is less than the second threshold, the TX UE may increase transmit power, and may request the RX UE to report RSRP for power control.

For example, if the RSRP value measured by the TX UE (e.g., the RSRP estimate value) is less than the first threshold and greater than the second threshold, the TX UE may configure/determine/adjust the report interval to be long.

In step S1630, the TX UE may transmit/configure a report configuration to the RX UE. For example, the report configuration may include the report interval. For example, the report interval may be configured/determined/adjusted based on the relative speed of the RX UE.

In step S1640, the RX UE may perform RSRP measurement based on the report configuration. In addition, for example, the RX UE may transmit information on RSRP to the TX UE based on the report interval.

Based on an embodiment of the present disclosure, the TX UE may configure the report interval to the RX UE differently based on the channel state for the RX UE, and the RX UE may report information on RSRP to the TX UE based on the report interval.

Based on an embodiment of the present disclosure, the TX UE may transmit/signal to the RX UE by configuring/determining the range of the report interval. In addition, for example, the RX UE may configure/determine the value of the report interval within the range of the report interval, and report information on RSRP to the TX UE. Also, for example, the RX UE may transmit/signal to the TX UE the value of the report interval configured/determined by the RX UE.

For example, in the embodiments of FIGS. 14 to 16, the TX UE may adjust parameters so that the RX UE periodically reports information on RSRP. On the other hand, the RX UE may be configured to report information on RSRP aperiodically. For example, in order for the RX UE to report information on RSRP aperiodically, a triggering criterion for aperiodic reporting may be defined. Alternatively, for example, a triggering criterion in which the RX UE reports information on RSRP may be configured by the TX UE to the RX UE similar to the legacy Uu operation.

Hereinafter, based on an embodiment of the present disclosure, if the RX UE aperiodically reports information on RSRP to the TX UE, it is proposed for condition(s) under which the reporting of information on RSRP is triggered.

Based on an embodiment of the present disclosure, if the RX UE is configured to periodically report information on RSRP by the TX UE, and the RX UE does not receive RS(s) to perform RSRP measurement during a reporting period, the RX UE may report the past RSRP measurement value to the TX UE at least once before the reporting period ends.

For example, in sidelink, in order for the RX UE to measure RSRP for the TX UE, it may be necessary for the RX UE to receive data from the TX UE. For example, since the RX UE measures RSRP for the TX UE by using DM-RS(s) included in the data region, in order for the RX UE to measure RSRP for the TX UE, it may be necessary for the RX UE to receive data from the TX UE. However, if there is no data to transmit because the TX UE does not perform data transmission for RSRP report from the RX UE, the TX UE may not transmit data and DM-RS(s) to the RX UE for a certain time, and accordingly, the TX UE cannot receive information on RSRP from the RX UE. However, for the purpose of power control of the TX UE, the RX UE needs to intermittently report information on RSRP. For example, if the TX UE configures periodic reporting to the RX UE for power control, and the RX UE does not receive RS(s) to perform RSRP measurement during a reporting period from the TX UE, the RX UE may report information on RSRP measured in the past to the RX UE. For example, information on RSRP measured in the past may be information on RSRP most recently measured by the RX UE. Based on the proposed method, although periodic reporting is configured for the RX UE, the RX UE may perform event-based triggering reporting.

As described above, in order for the RX UE to perform RSRP measurement/reporting, it may be necessary for the TX UE to transmit data (e.g., including DM-RS) to the RX UE. For example, if the TX UE configures periodic RSRP reporting to the RX UE, and the TX UE does not have data to transmit, the RX UE may not be able to report information on RSRP to the TX UE within the corresponding reporting period since there is no RS to measure. However, since the TX UE may request periodic reporting from the RX UE for power control of the TX UE, if the TX UE has configured periodic reporting to the RX UE, the TX UE may have to transmit data to the RX UE at least once even if there is no sidelink data to transmit within the corresponding reporting period. Therefore, if the TX UE configures periodic reporting to the RX UE, the TX UE may be configured/specified to transmit data (e.g., including DM-RS) at least once within the corresponding reporting period.

Hereinafter, based on various embodiments of the present disclosure, if the RX UE aperiodically reports information on RSRP to the TX UE, another condition for triggering reporting of information on RSRP is proposed.

In the legacy NR Uu, there are measurement report triggering conditions such as A1 to A6, B1 and B2. For example, based on the A1 event or the A2 event, if a measurement result (e.g., RSRP value) measured by the UE in a serving cell is greater than a specific threshold (e.g., A1 condition) or less than a specific threshold (e.g., A2 condition), the UE may report the measurement result to the base station. Similarly, if a sidelink measurement result measured by the UE is less than or greater than a specific threshold, the UE may report the measurement result. However, this method is similar to the legacy Uu operation and may be a meaningless condition due to the characteristics of sidelink communication with speed. That is, if the UE reports based on a fixed threshold, continuous reporting by the UE may be triggered in a specific environment. Alternatively, for example, if the difference between a measurement result measured in the most recent past by the RX UE and a measurement result currently measured by the RX UE is greater than or equal to a specific offset, the RX UE may report the measurement result. For example, if the RX UE observes an RSRP measurement value that is smaller (or larger) by a specific dB offset than an RSRP value measured in advance, the RX UE may determine that there is a change in the sidelink channel environment, and the RX UE may report the measurement result. Herein, for example, the offset may be pre-configured for the UE through a pool configuration. For example, the offset may be defined/exchanged through UE dedicated signaling.

Or, for example, similar to the conventional A1 condition or A2 condition, but the RX UE may not use a fixed threshold and may compare measurement result values by using a dynamic threshold. Herein, the dynamic threshold may be configured to the RX UE by the base station or the TX UE. For example, the base station or the TX UE may flexibly adjust the threshold based on the observed congestion situation (e.g., CBR level) or channel quality, and transmit/signal it to the RX UE.

Or, for example, the RX UE may estimate a past average channel condition while accumulating channel values monitored by the RX UE (e.g., the channel condition monitored by the sensing window for MODE 2 resource allocation, or channel information obtained through sidelink data exchanged with the UE performing unicast communication). In this case, the RX UE may flexibly select a specific threshold based on the estimated channel value. For example, the RX UE may determine a specific level in channel samples measured from the past as a threshold value for RSRP reporting.

Or, for example, a congestion level (e.g., CBR) measured by the RX UE may be used as a triggering condition for RSRP reporting. If the congestion level measured by the RX UE is greater than a certain threshold, the RX UE may trigger RSRP reporting. If the congestion level is high, it is advantageous for the TX UE to frequently perform a specific sidelink operation (e.g., power control) by using the sidelink channel information because the channel variation between sidelinks is sensitive. Therefore, such an operation is necessary.

Or, the RX UE may perform RSRP reporting based on QoS information (e.g., priority information) of data received from the TX UE. For example, the RX UE may measure/estimate RSRP based on reference signal(s) on a channel transmitted by the TX UE. In this case, the RX UE may determine whether to perform RSRP measurement/reporting based on priority information of data transmitted by the TX UE. If the RX UE receives a MAC PDU related to SCI indicating high priority, the RX UE may be defined to measure and report RSRP. Herein, the high priority may mean a case in which the RX UE observes a priority level higher than a predetermined specific priority level.

For example, for SL-RSRP measurement/reporting, the RX UE may receive a configuration related to measurement/reporting (e.g., the report interval, reporting criterion, filtering coefficient) from the TX UE or the base station. For example, the configuration related to measurement/reporting may be received through system information such as PC5-RRC signaling or pool configuration. For example, the configuration related to measurement/reporting (e.g., parameters related to measurement reporting) may be configured in advance for each sidelink radio bearer or defined for each specific logical channel priority. In this case, for example, the RX UE may select a parameter for measurement/reporting through data transmitted by the TX UE. In this case, for example, for a sidelink MAC PDU in which information having a plurality of logical channel priorities is multiplexed, the RX UE may configure a parameter mapped to a logical channel or a sidelink radio bearer having the highest priority as a parameter for measurement/reporting of the corresponding MAC PDU, and may report it. Through this operation, the RX UE may perform measurement/reporting of the MAC PDU multiplexed with information having various logical channel priorities by setting parameters to match the priorities.

Based on various embodiments of the present disclosure, the report interval may be signaled in a PC5-RRC message. Alternatively, for example, the report interval may be defined in a pool configuration in the form of a lookup table. For example, in the conventional LTE sidelink, in order for parameter adaptation according to CBR measurement, a CBR lookup table exists. For example, the UE adjusts other parameters according to the measured CBR based on the lookup table. Similarly, parameters for SL-RSRP reporting may be defined in a lookup table method. In addition, parameters for SL-RSRP reporting may be signaled to the RX UE through pool configuration or system information, and the RX UE may perform a measurement report through the lookup table.

Meanwhile, when the RX UE reports information on SL-RSRP to the TX UE, one issue may be which measurement result value the RX UE reports. For example, the RX UE may report an L1-SL-RSRP value directly to the TX UE, and the RX UE may report an SL-RSRP value for which L3-filtering is performed. For example, the RX UE may perform L3-filtering based on the procedure in Table 11. The L3-filtering procedure may refer to section 5.5.3.2 of 3GPP TS 38.331 V15.7.0 (2019-09).

TABLE 11

5.5.3.2 Layer 3 filtering
The UE shall:
- 1> for each cell measurement quantity and for each beam measurement quantity that the UE performs measurements according to 5.5.3.1:
  - 2> filter the measured result, before using for evaluation of reporting criteria or for measurement reporting, by the following formula:
    $$F_n = (1 - a)*F_{n-1} + a*M_n$$
    where
    $M_n$ is the latest received measurement result from the physical layer;
    $F_n$ is the updated filtered measurement result, that is used for evaluation of reporting criteria or for measurement reporting;
    $F_{n-1}$ is the old filtered measurement result, where $F_0$ is set to $M_1$ when the first measurement result from the physical layer is received; and for NR, $a = 1/2^{(ki/4)}$, where $k_i$ is the filterCoefficient for the corresponding measurement quantity of the i:th QuantityConfigNR in quantityConfigNR-List, and i is indicated by quantityConfigIndex in MeasObjectNR; for E-UTRA, $a = 1/2^{(k/4)}$, where k is the filterCoefficient for the corresponding measurement quantity received by quantityConfigEUTRA in the quantityConfig;
  - 2> adapt the filter such that the time characteristics of the filter are preserved at different input rates, observing that the filterCoefficient k assumes a sample rate equal to X ms; The value of X is equivalent to one intra-frequency L1 measurement period as defined in TS 38.133 [14] assuming non-DRX operation, and depends on frequency range.
- NOTE 1: If k is set to 0, no layer 3 filtering is applicable.
- NOTE 2: The filtering is performed in the same domain as used for evaluation of reporting criteria or for measurement reporting, i.e., logarithmic filtering for logarithmic measurements.
- NOTE 3: The filter input rate is implementation dependent, to fulfil the performance requirements set in TS 38.133 [14]. For further details about the physical layer measurements, see TS 38.133 [14].

Referring to Table 11, the RX UE may filter the measurement result value based on Equation 1.

$$F_n = (1-a)*F_{n-1} + a*M_n \quad \text{[Equation 1]}$$

Herein, $F_{n-1}$ is a past filtering value, and $M_n$ may be a result value most recently measured by the RX UE. For example, the RX UE may calculate/obtain a new filtering value $F_n$ by applying a coefficient a to $F_{n-1}$ and $M_n$.

Herein, a may be obtained based on Equation 2.

$$a = 1/2^{(ki/4)} \quad \text{[Equation 2]}$$

Herein, ki may be a filter coefficient for the corresponding measurement quantity of the i-th QuantityConfigNR in quantityConfigNR-List. For example, the filter coefficient may be defined as shown in Table 12.

TABLE 12

-- ASN1START
-- TAG-FILTERCOEFFICIENT-START
FilterCoefficient ::=    ENUMERATED { fc0, fc1, fc2, fc3, fc4, fc5, fc6, fc7, fc8, fc9, fc11, fc13, fc15, fc17, fc19, spare1, ...}
-- TAG-FILTERCOEFFICIENT-STOP
-- ASN1STOP Referring to Table 12, fc0 may mean a case where the filter coefficient is 0, and fc1 may mean a case where the filter coefficient is 2. For example, the filter coefficient may be zero and/or a positive integer. For example, the filter coefficient may be one of 0, 1, 2, 3, 4, 5, 6, 7, 8, 9, 11, 13, 15, 17, or 19. The above-described filter coefficient are merely exemplary, and the technical idea of the present disclosure is not limited to the above-described filter coefficient.

Hereinafter, based on various embodiments of the present disclosure, in order for the RX UE to perform L3 filtering and report information on SL-RSRP to the TX UE, a method for configuring a parameter related to L3 filtering and an apparatus supporting the same are explained. For example, the parameter may be a filter coefficient.

Based on an embodiment of the present disclosure, the parameter for L3 filtering may be included in a resource pool configuration for V2X communication and configured for the UE.

For example, the base station may transmit the resource pool configuration to the UE through a SIB. For example, the base station may transmit the resource pool configuration to the UE through a dedicated signal. For example, the base station may configure or pre-configure a resource pool to the UE.

For example, the UE may use the same filter coefficient for each resource pool. For example, the UE may configure the L3 filtering parameter based on the obtained resource pool configuration. For example, if the UE is configured with a first resource pool, the UE may perform L3 filtering by using a filter coefficient related to the first resource pool. For example, if the UE is configured with a second resource pool, the UE may perform L3 filtering by using a filter coefficient related to the second resource pool.

Based on the above-described embodiment, since there is no need for adaptation to the parameter or signaling for configuring the parameter to the UE, the design may be simple. However, since the parameter is fixed for each resource pool, flexibility according to the environment in which the UE performs SL communication may be limited.

Based on an embodiment of the present disclosure, the TX UE may receive a parameter (e.g., filter coefficient) for L3-filtering from the base station. In addition, the TX UE may transmit the parameter for L3-filtering to the peer UE through a part of PC5-RRC configuration. For example, the peer UE may be a UE that has established a PC5-RRC connection with the TX UE for SL unicast communication.

For example, in the conventional NR Uu interface, the UE may receive, from the base station, a parameter for L3-filtering used when reporting information on RSRP to the base station. For example, the UE may receive the parameter for L3-filtering from the base station through an RRC information element (IE) or an RRC message.

For example, similarly in sidelink, the UE may follow the conventional NR Uu operation. For example, the TX UE may receive a parameter for L3-filtering from the base station. For example, the TX UE may receive the parameter for L3-filtering from the base station through a Uu DL RRC message. However, unlike the NR Uu operation, the parameter for the L3-filtering is not a parameter used by the TX UE. For example, the parameter for L3-filtering may be a parameter used/required by the peer UE that has established a PC5-RRC connection with the TX UE. Therefore, when the TX UE establishes a PC5-RRC connection with the peer UE, and the TX UE exchanges parameters related to the PC5-RRC connection with the peer UE, the TX UE may exchange the parameter for L3-filtering together. For example, when the TX UE establishes a PC5-RRC connection with the peer UE, and the TX UE exchanges an AS layer configuration with the peer UE, the AS layer configuration may include the parameter for L3-filtering. Or, for example, the TX UE may transmit a PC5-RRC message including the parameter for L3-filtering to the peer UE.

Figure 17:
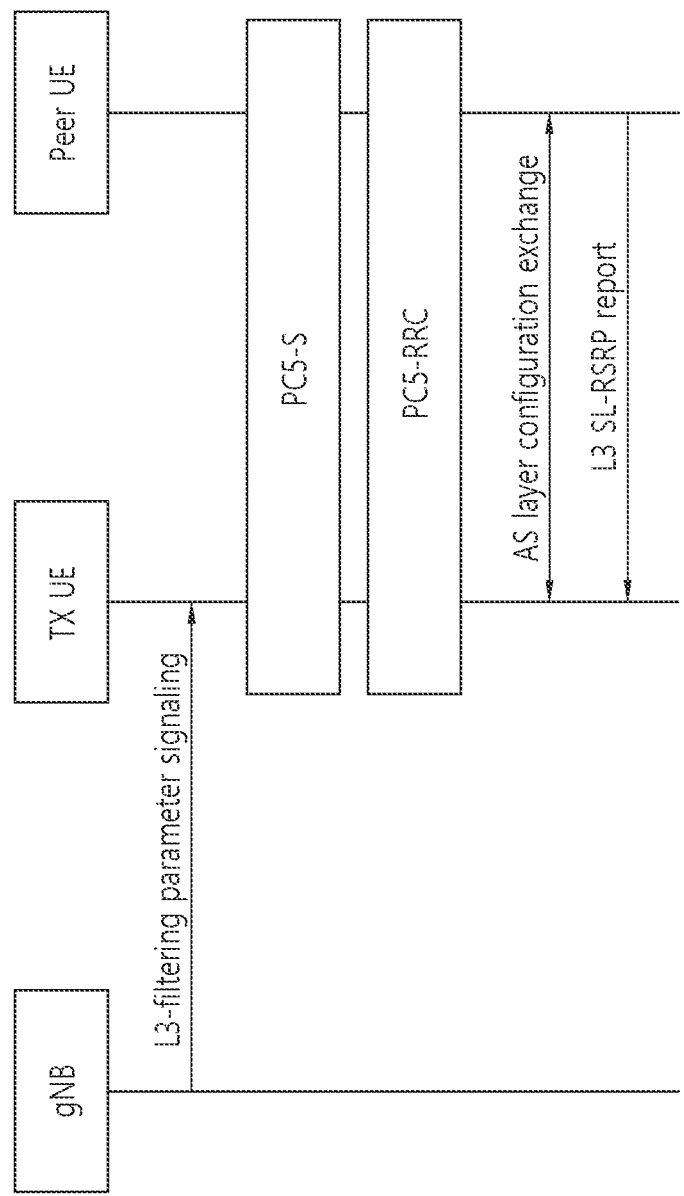
FIG. 17 shows a procedure in which a TX UE exchanges a parameter for L3-filtering configured from a base station with a peer UE, based on an embodiment of the present disclosure.

FIG. 17 shows a procedure in which a TX UE exchanges a parameter for L3-filtering configured from a base station with a peer UE, based on an embodiment of the present disclosure. The embodiment of FIG. 17 may be combined with various embodiments of the present disclosure.

Based on an embodiment of the present disclosure, the TX UE may receive a range of a parameter for L3-filtering (e.g., a range of a filter coefficient) from the base station. In addition, the TX UE may transmit the range of the parameter for L3-filtering (e.g., the range of the filter coefficient) to the RX UE. And/or, for example, the TX UE may transmit, to the RX UE, a range of a parameter for L3-filtering (e.g., a range of a filter coefficient) selected by the TX UE by itself. For example, the RX UE may select any one parameter for L3-filtering from the range of the parameter for L3-filtering, and the RX UE may perform L3-filtering by using the selected parameter for L3-filtering. For example, the RX UE may select the largest value among the range of the filter coefficient. For example, the RX UE may select the smallest value among the range of the filter coefficient.

In the communication between the base station and the UE in the conventional NR Uu, the base station configures a parameter for L3-filtering to the UE based on various information obtained from the UE (e.g., channel state information between the base station and the UE, the distance between the base station and the UE, measurement information on other cells reported by the UE to the base station, etc.). On the other hand, in sidelink communication, since the TX UE or the base station cannot completely control the peer UE performing unicast communication with the TX UE, it may be difficult for the TX UE to select a parameter that the RX UE will use for RSRP reporting and transmit it to the RX UE. Accordingly, the TX UE or the base station may transmit to the RX UE the range of the parameter for L3-filtering (e.g., filter coefficient) to be used by the RX UE, and the RX UE may perform L3-filtering by selecting a specific parameter within the range of the parameter for L3-filtering. For example, the TX UE may transmit the range of the parameter for L3-filtering to the RX UE through AS layer configuration while the TX UE establishes a PC5-RRC connection with the peer UE. For example, the TX UE may transmit the range of the parameter for L3-filtering to the RX UE through a PC5-RRC message.

Based on various embodiments of the present disclosure, the RX UE may report the L3 filtered SL-RSRP to the TX UE by using the parameter for L3-filtering configured by the TX UE or the base station. Therefore, the TX UE may perform power control based on the L3 filtered SL-RSRP or appropriately estimate the channel state through the RSRP.

Figure 18:
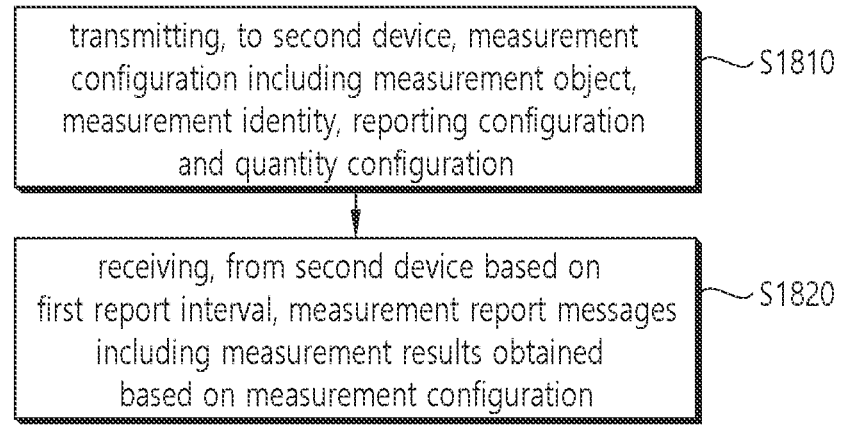
FIG. 18 shows a method for a first device to perform wireless communication, based on an embodiment of the present disclosure.

FIG. 18 shows a method for a first device to perform wireless communication, based on an embodiment of the present disclosure. The embodiment of FIG. 18 may be combined with various embodiments of the present disclosure.

Referring to FIG. 18, in step S1810, the first device may transmit, to a second device, a measurement configuration including a measurement object, a measurement identity, a reporting configuration and a quantity configuration. For example, the reporting configuration may include information related to a first report interval. In step S1820, the first device may receive, from the second device based on the first report interval, a plurality of measurement report messages including measurement results obtained based on the measurement configuration. For example, the first report interval may be determined by the first device.

Additionally, the first device may measure a channel busy ratio (CBR). For example, the first report interval may be determined by the first device based on the CBR. For example, the CBR may be measured for at least one of a resource pool, a bandwidth part (BWP) or a carrier. For example, based on the CBR exceeding a threshold, the first report interval may be determined to be long. For example, based on the CBR not exceeding a threshold, the first report interval may be determined to be short.

Additionally, the first device may measure relative speed of the second device. For example, the first report interval may be determined by the first device based on the relative speed of the second device. For example, the relative speed of the second device may be measured based on a cooperative awareness message (CAM) message transmitted by the second device. For example, based on the relative speed of the second device exceeding a threshold, the first report interval may be determined to be long. For example, based on the relative speed of the second device not exceeding a threshold, the first report interval may be determined to be short.

Additionally, the first device may receive a reference signal from the second device, and the first device may measure a channel state between the first device and the second device based on the reference signal. For example, the first report interval may be determined by the first device based on the channel state. For example, based on a value related to the channel state being less than a first threshold and greater than a second threshold, the first report interval may be determined to be long, and based on a value related to the channel state being greater than a first threshold or less than a second threshold, the first report interval may be determined to be short. For example, the first threshold may be greater than the second threshold.

Additionally, the first device may receive, from a base station, information related to a second report interval, and the first device may adjust the second report interval to the first report interval.

The proposed method can be applied to the device(s) described in the various embodiments of the present disclosure. First, the processor 102 of the first device 100 may control the transceiver 106 to transmit, to a second device, a measurement configuration including a measurement object, a measurement identity, a reporting configuration and a quantity configuration. For example, the reporting configuration may include information related to a first report interval. In addition, the processor 102 of the first device 100 may control the transceiver 106 to receive, from the second device based on the first report interval, a plurality of measurement report messages including measurement results obtained based on the measurement configuration. For example, the first report interval may be determined by the first device.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, to a second device, a measurement configuration including a measurement object, a measurement identity, a reporting configuration and a quantity configuration, wherein the reporting configuration includes information related to a first report interval; and receive, from the second device based on the first report interval, a plurality of measurement report messages including measurement results obtained based on the measurement configuration, wherein the first report interval is determined by the first device.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: transmit, to a second UE, a measurement configuration including a measurement object, a measurement identity, a reporting configuration and a quantity configuration, wherein the reporting configuration includes information related to a first report interval; and receive, from the second UE based on the first report interval, a plurality of measurement report messages including measurement results obtained based on the measurement configuration, wherein the first report interval is determined by the first UE.

Based on an embodiment of the present disclosure, a non-transitory computer-readable storage medium storing instructions may be provided. For example, the instructions, when executed, may cause a first device to: transmit, to a second device, a measurement configuration including a measurement object, a measurement identity, a reporting configuration and a quantity configuration, wherein the reporting configuration includes information related to a first report interval; and receive, from the second device based on the first report interval, a plurality of measurement report messages including measurement results obtained based on the measurement configuration, wherein the first report interval is determined by the first device.

Figure 19:
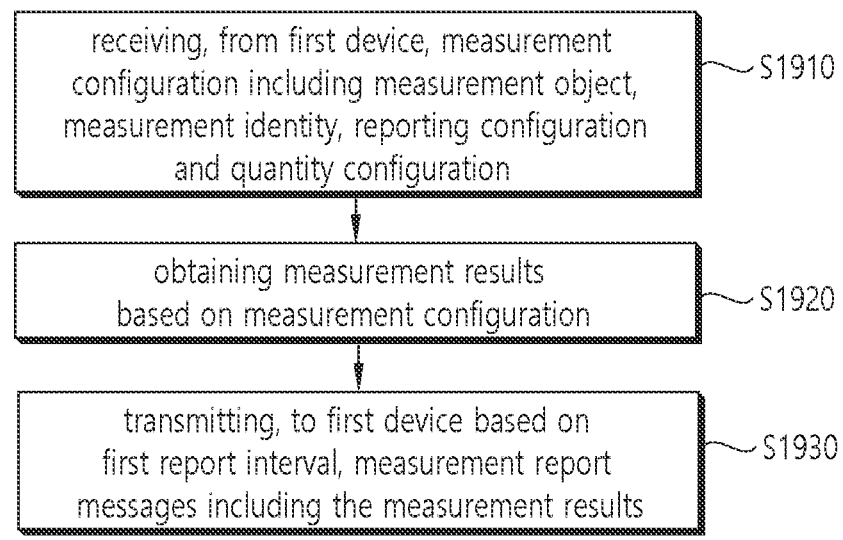
FIG. 19 shows a method for a second device to perform wireless communication, based on an embodiment of the present disclosure.

FIG. 19 shows a method for a second device to perform wireless communication, based on an embodiment of the present disclosure. The embodiment of FIG. 19 may be combined with various embodiments of the present disclosure.

Referring to FIG. 19, in step S1910, the second device may receive, from a first device, a measurement configuration including a measurement object, a measurement identity, a reporting configuration and a quantity configuration. For example, the reporting configuration may include information related to a first report interval. In step S1920, the second device may obtain measurement results based on the measurement configuration. In step S1930, the second device may transmit, to the first device based on the first report interval, a plurality of measurement report messages including the measurement results. For example, the first report interval may be determined by the first device.

The proposed method can be applied to the device(s) described in the various embodiments of the present disclosure. First, the processor 202 of the second device 200 may control the transceiver 206 to receive, from a first device, a measurement configuration including a measurement object, a measurement identity, a reporting configuration and a quantity configuration. For example, the reporting configuration may include information related to a first report interval. In addition, the processor 202 of the second device 200 may obtain measurement results based on the measurement configuration. In addition, the processor 202 of the second device 200 may control the transceiver 206 to transmit, to the first device based on the first report interval, a plurality of measurement report messages including the measurement results. For example, the first report interval may be determined by the first device.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device, a measurement configuration including a measurement object, a measurement identity, a reporting configuration and a quantity configuration, wherein the reporting configuration includes information related to a first report interval; obtain measurement results based on the measurement configuration; and transmit, to the first device based on the first report interval, a plurality of measurement report messages including the measurement results, wherein the first report interval is determined by the first device.

Based on an embodiment of the present disclosure, an apparatus configured to control a second user equipment (UE) performing wireless communication may be provided. For example, the apparatus may comprise: one or more processors; and one or more memories operably connected to the one or more processors and storing instructions. For example, the one or more processors may execute the instructions to: receive, from a first UE, a measurement configuration including a measurement object, a measurement identity, a reporting configuration and a quantity configuration, wherein the reporting configuration includes information related to a first report interval; obtain measurement results based on the measurement configuration; and transmit, to the first UE based on the first report interval, a plurality of measurement report messages including the measurement results, wherein the first report interval is determined by the first UE.

Based on an embodiment of the present disclosure, anontransitory computer-readable storage medium storing instructions may be provided. For example, the instructions, when executed, may cause a second device to: receive, from a first device, a measurement configuration including a measurement object, a measurement identity, a reporting configuration and a quantity configuration, wherein the reporting configuration includes information related to a first report interval; obtain measurement results based on the measurement configuration; and transmit, to the first device based on the first report interval, a plurality of measurement report messages including the measurement results, wherein the first report interval is determined by the first device.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
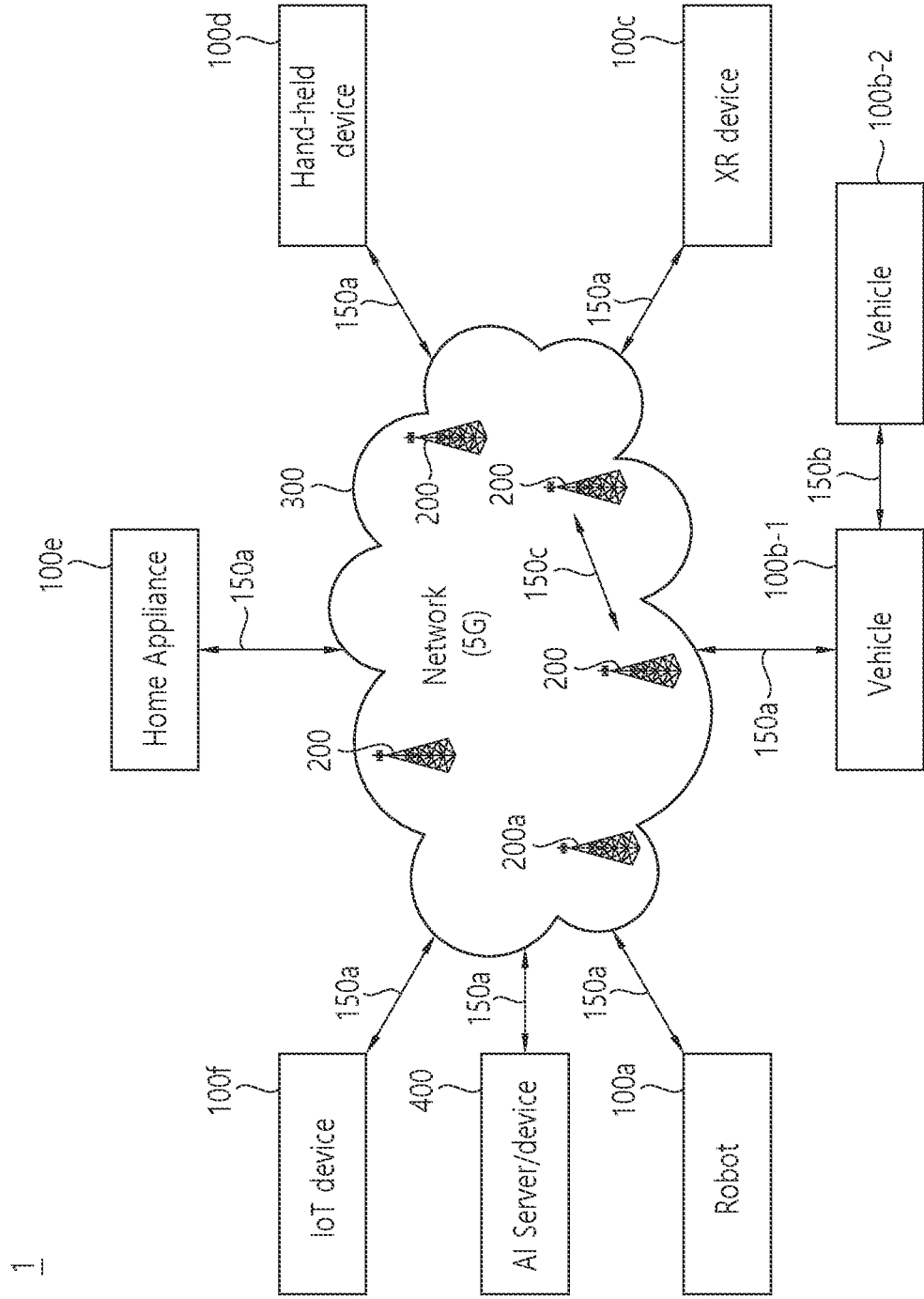
FIG. 20 shows a communication system 1, based on an embodiment of the present disclosure.

FIG. 20 shows a communication system 1, based on an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
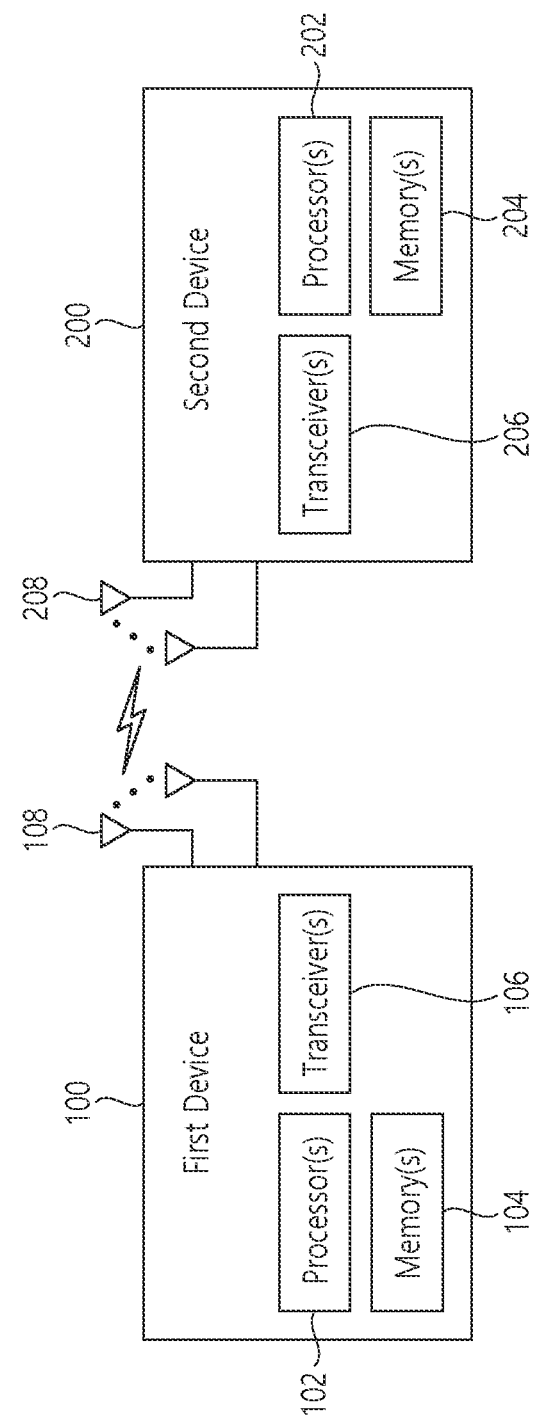
FIG. 21 shows wireless devices, based on an embodiment of the present disclosure.

FIG. 21 shows wireless devices, based on an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
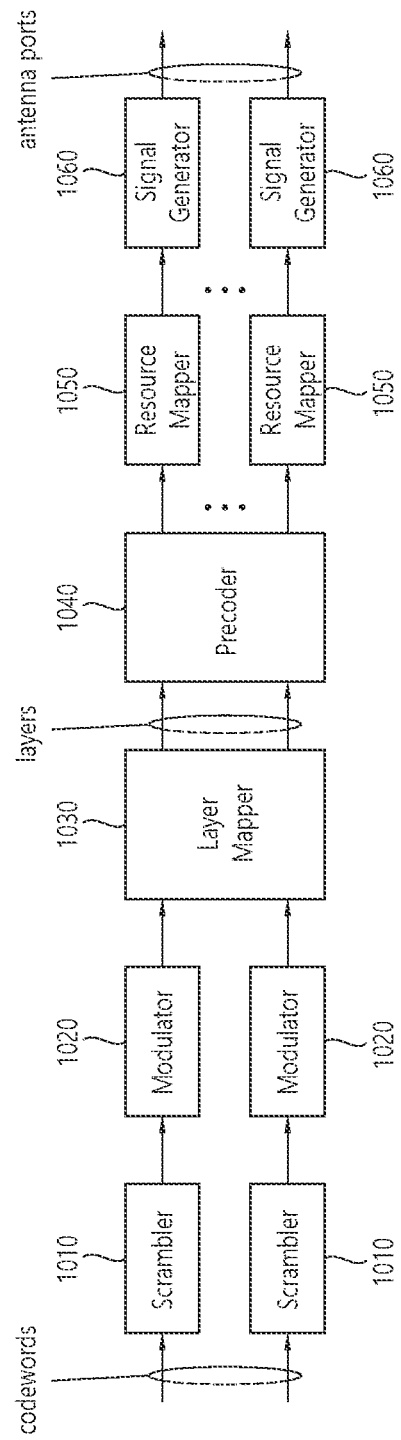
FIG. 22 shows a signal process circuit for a transmission signal, based on an embodiment of the present disclosure.

FIG. 22 shows a signal process circuit for a transmission signal, based on an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
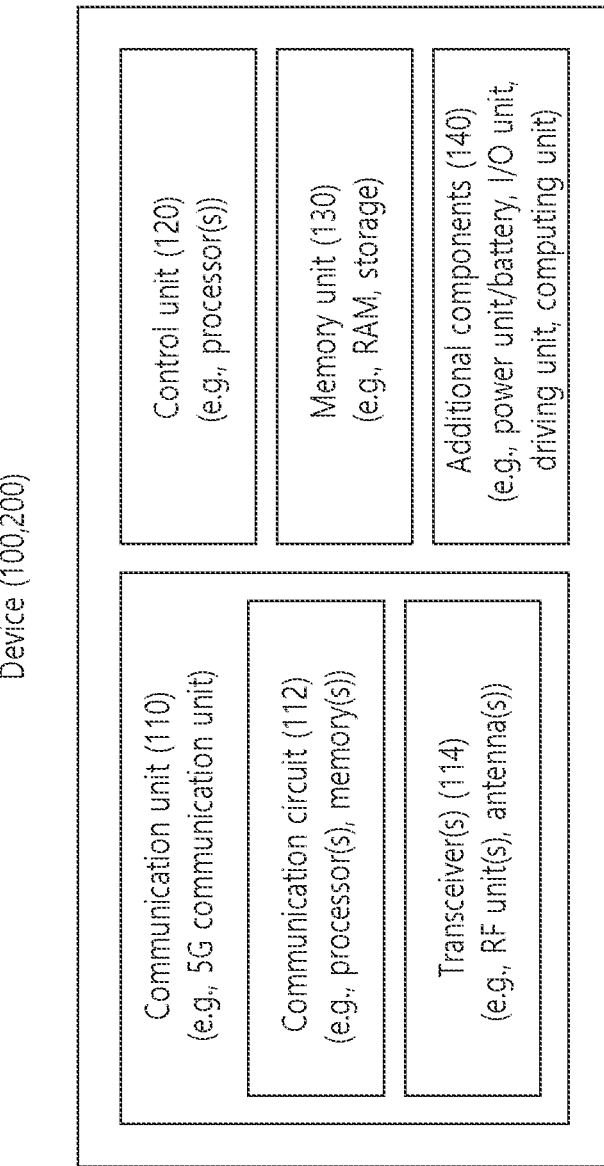
FIG. 23 shows another example of a wireless device, based on an embodiment of the present disclosure.

FIG. 23 shows another example of a wireless device, based on an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
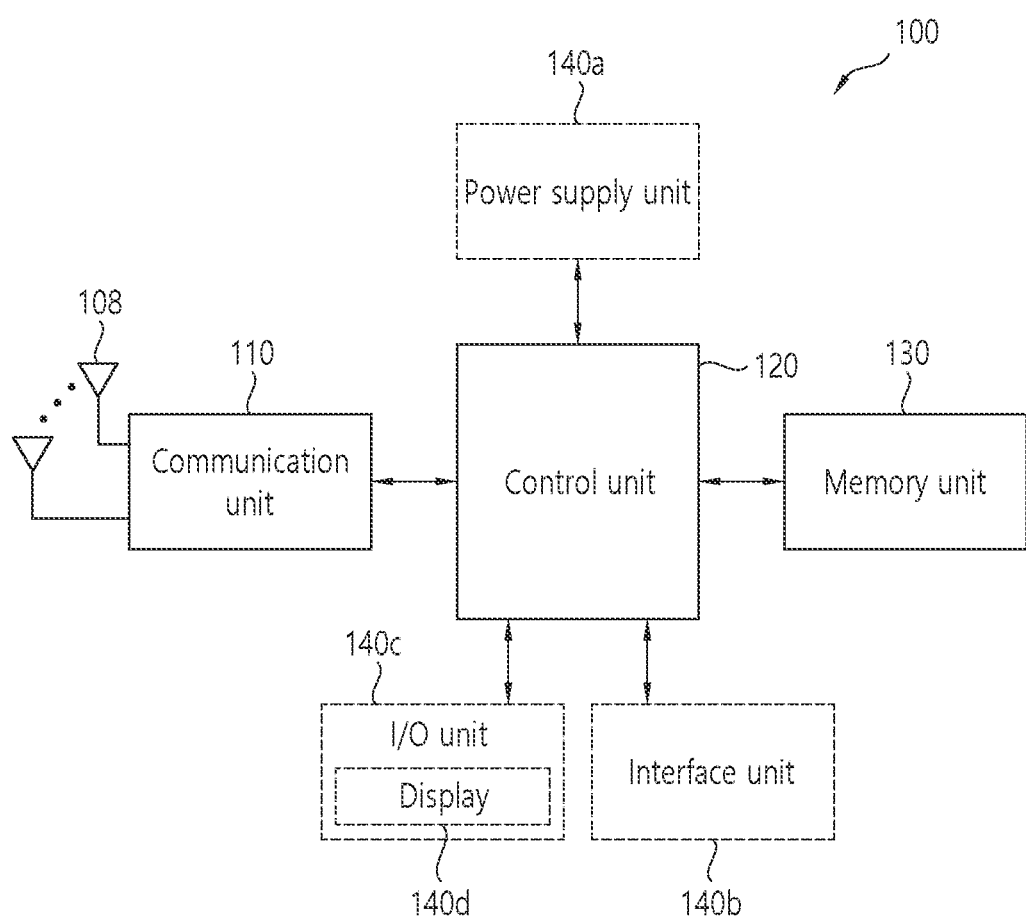
FIG. 24 shows a hand-held device, based on an embodiment of the present disclosure.

FIG. 24 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
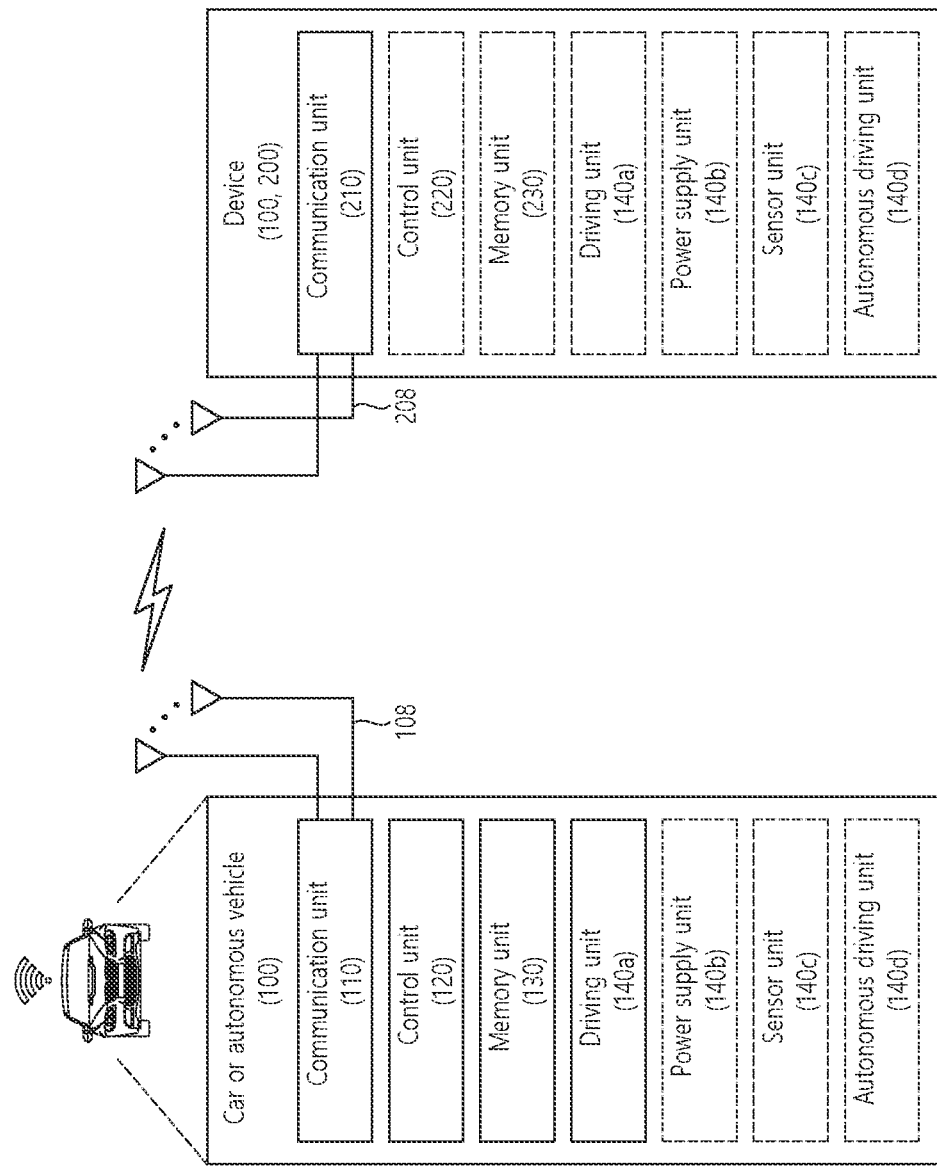
FIG. 25 shows a vehicle or an autonomous vehicle, based on an embodiment of the present disclosure.

FIG. 25 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    measuring a channel congestion level;
    transmitting, to a second device, a measurement configuration including a measurement object, a measurement identity, a reporting configuration and a quantity configuration,
    wherein the reporting configuration includes information related to a first report interval; and
    receiving, from the second device based on the first report interval, a plurality of measurement report messages including measurement results obtained based on the measurement configuration,
    wherein the first report interval is determined by the first device based on the channel congestion level.

2. The method of claim 1, wherein the channel congestion level is measured for at least one of a resource pool, a bandwidth part or a carrier.

3. The method of claim 1, wherein, based on the channel congestion level exceeding a threshold, the first report interval is determined to be long.

4. The method of claim 1, wherein, based on the channel congestion level not exceeding a threshold, the first report interval is determined to be short.

5. The method of claim 1, further comprising:
    measuring relative speed of the second device,
    wherein the first report interval is determined by the first device further based on the relative speed of the second device.

6. The method of claim 5, wherein the relative speed of the second device is measured based on a cooperative awareness message (CAM) message transmitted by the second device.

7. The method of claim 5, wherein, based on the relative speed of the second device exceeding a threshold, the first report interval is determined to be long.

8. The method of claim 5, wherein, based on the relative speed of the second device not exceeding a threshold, the first report interval is determined to be short.

9. The method of claim 1, further comprising:
    receiving a reference signal from the second device; and
    measuring a channel state between the first device and the second device based on the reference signal,
    wherein the first report interval is determined by the first device further based on the channel state.

10. The method of claim 9, wherein, based on a value related to the channel state being less than a first threshold and greater than a second threshold, the first report interval is determined to be long, and
    wherein the first threshold is greater than the second threshold.

11. The method of claim 9, wherein, based on a value related to the channel state being greater than a first threshold or less than a second threshold, the first report interval is determined to be short, and
    wherein the first threshold is greater than the second threshold.

12. The method of claim 1, further comprising:
    receiving, from a base station, information related to a second report interval; and
    adjusting the second report interval to the first report interval.

13. A first device adapted to perform wireless communication, the first device comprising:
    at least one transceiver;
    at least one processor; and
    at least one memory connected to the at least one processor and storing instructions that, based on being executed, cause the first device to perform operations comprising:
    measuring a channel congestion level;
    transmitting, to a second device, a measurement configuration including a measurement object, a measurement identity, a reporting configuration and a quantity configuration,
    wherein the reporting configuration includes information related to a first report interval; and
    receiving, from the second device based on the first report interval, a plurality of measurement report messages including measurement results obtained based on the measurement configuration,
    wherein the first report interval is determined by the first device based on the channel congestion level.

14. The first device of claim 13, wherein the channel congestion level is measured for at least one of a resource pool, a bandwidth part (BWP) or a carrier.

15. The first device of claim 13, wherein, based on the channel congestion level exceeding a threshold, the first report interval is determined to be long.

16. The first device of claim 13, wherein, based on the channel congestion level not exceeding a threshold, the first report interval is determined to be short.

17. A processing device adapted to control a first device performing wireless communication, the processing device comprising:
    at least one processor; and
    at least one memory connected to the at least one processor and storing instructions that, based on being executed, cause the first device to perform operations comprising:
    measuring a channel congestion level;
    transmitting, to a second device, a measurement configuration including a measurement object, a measurement identity, a reporting configuration and a quantity configuration,
    wherein the reporting configuration includes information related to a first report interval; and
    receiving, from the second device based on the first report interval, a plurality of measurement report messages including measurement results obtained based on the measurement configuration, wherein the first report interval is determined by the first device based on the channel congestion level.

18. The processing device of claim 17, wherein the channel congestion level is measured for at least one of a resource pool, a bandwidth part or a carrier.

19. The processing device of claim 17, wherein, based on the channel congestion level exceeding a threshold, the first report interval is determined to be long.

20. The processing device of claim 17, wherein, based on the channel congestion level not exceeding a threshold, the first report interval is determined to be short.

* * * * *